US008339652B2

(12) United States Patent
Tsukuda

(10) Patent No.: US 8,339,652 B2
(45) Date of Patent: Dec. 25, 2012

(54) LABEL CREATING APPARATUS, METHOD FOR CONTROLLING LABEL CREATING APPARATUS AND COMPUTER PROGRAM

(75) Inventor: Hideyuki Tsukuda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 965 days.

(21) Appl. No.: 12/398,862

(22) Filed: Mar. 5, 2009

(65) Prior Publication Data

US 2009/0231608 A1 Sep. 17, 2009

(30) Foreign Application Priority Data

Mar. 12, 2008 (JP) ................................. 2008-062331
Oct. 31, 2008 (JP) ................................. 2008-281593

(51) Int. Cl.
*G06K 15/02* (2006.01)
*G06K 15/00* (2006.01)

(52) U.S. Cl. ...................................... 358/1.18; 358/1.11

(58) Field of Classification Search ................. 358/1.11, 358/1.18
See application file for complete search history.

(56) References Cited

U.S. PATENT DOCUMENTS 5,496,117 A 3/1996 Sawada et al.
6,722,563 B1 * 4/2004 Johnson et al. ............... 235/375
7,144,168 B2 12/2006 Woodman
7,251,044 B1 7/2007 Kurashina
2005/0105948 A1 5/2005 Woodman
2008/0247798 A1 * 10/2008 Buzuev et al. .................. 400/67

FOREIGN PATENT DOCUMENTS

EP 0654747 A2 11/1994
EP 0945808 A2 9/1999
JP 06-247431 9/1994
JP 2001-001603 1/2001

OTHER PUBLICATIONS

The United States Postal Service. "Information-Based Indicia Program (IBIP): Performance Criteria for Information-Based Indicia and Security Architecture for Open IBI Postage Evidencing Systems". Feb. 23, 2000.*
European search report for corresponding European application 09003212.9 lists the references above.

* cited by examiner

*Primary Examiner* — Twyler Haskins
*Assistant Examiner* — Fred Guillermety
(74) *Attorney, Agent, or Firm* — DLA Piper LLP (US)

(57) ABSTRACT

Provided herein is a label creating apparatus including: a memory unit to associate and memory a first character or graphic with a second character or graphic that has a pairwise relationship with the first character or graphic; an input unit to allow inputting the first character or graphic; a display unit to display according to the first character or graphic input with the input unit the second character or graphic memory in the memory unit; and a printing unit to print the first character or graphic that has been input and the second character or graphic that has been displayed. The label creating apparatus creates a pair of labels on which the characters or graphics that have a pairwise relationship are respectively printed.

11 Claims, 19 Drawing Sheets

LABEL CREATING APPARATUS, METHOD FOR CONTROLLING LABEL CREATING APPARATUS AND COMPUTER PROGRAM

The entire disclosures of Japanese Patent Application numbers 2008-062331, filed Mar. 12, 2008 and 2008-281593, filed Oct. 31, 2008, respectively, are incorporated by references herein.

BACKGROUND

1. Technical Field

The present invention relates to a label creating apparatus for successively printing two or more characters or graphics to create two or more labels, a method for controlling a label creating apparatus and a computer program.

2. Related Art

A label creating apparatus for creating two or more labels by successively printing two or more registered character strings and making an automatic cut between images that are respective printing results has been known as one type of label creating apparatus (tape printing apparatus), as described in JP-A-2001-001603.

Such a label creating apparatus may create labels constituting a pair of labels that has a pairwise relationship, such as labels to be affixed on both sides of a door for showing "PUSH" and "PULL", and labels to be affixed next to buttons mounted on an electronic device for showing "ON" and "OFF". Used to create such a pair of labels, the label creating apparatus has involved a problem in which two characters or graphics that have a pairwise relationship need to be individually input, which complicates creation processes. Unless a user knows the character or graphic that has a pairwise relationship with a character or graphic, there has also been a problem in which the user needs to look the character or graphic up in a dictionary or the like to input it.

SUMMARY

An advantage of some aspects of the invention is to provide a label creating apparatus that requires no complicated processes and facilitates creation of a pair of labels on which two characters or graphics having a pairwise relationship are respectively printed, a method for controlling a label creating apparatus and a computer program.

A label creating apparatus according to one aspect of the invention includes a memory unit to associate and memory a first character or graphic with a second character or graphic that has a pairwise relationship with the first character or graphic, an input unit to allow inputting the first character or graphic, a display unit to display according to the first character or graphic input with the input unit the second character or graphic memory in the memory unit, and a printing unit to print the first character or graphic that has been input and the second character or graphic that has been displayed. The label creating apparatus creates a pair of labels on which the characters or graphics that have the pairwise relationship are respectively printed.

A method for controlling a label creating apparatus according to another aspect of the invention is a method for controlling a label creating apparatus including a memory section, an input section, a display section, a printing section, and a control section to control the foregoing sections. The method includes the following steps performed by the control section: associating and memorizing a first character or graphic with a second character or graphic having a pairwise relationship with the first character or graphic in the memory section, displaying on the display section the second character or graphic memory in the memory section according to the first character or graphic input with the input section, and printing the first character or graphic input with the input section and the second character or graphic displayed on the display section with the printing section. The control section creates a pair of labels on which the characters or graphics having the pairwise relationship are respectively printed.

Under these configurations, it is possible to create by inputting only one character or graphic a pair of labels on which two characters or graphics having a pairwise relationship are respectively printed. Accordingly, a user is not required to look the other character or graphic up. The display unit (display section) displays the other character or graphic before printing, which allows the user to verify it before label creation. The "characters or graphics having a pairwise relationship" referred to herein are not limited to those which have opposite meanings, such as "push" and "pull", and "large" and "small", but include those which are considered to be a pair, such as "red" and "white", and "fork" and "knife". "Characters" referred to herein include character strings, and "graphics" referred to herein include symbols.

In this case, it is preferable that the label creating apparatus further include a selection unit to allow selecting a desired character or graphic from a plurality of such second characters or graphics displayed on the display unit. It is also preferable that the printing unit print the first character or graphic that has been input and the second character or graphic selected with the selection unit.

Under this configuration, the second character or graphic to be printed is selected from the second characters or graphics that have a pairwise relationship with the first character or graphic that has been input; therefore, it is possible to create a label having desired characters or graphics even though a plurality of characters or graphics have a pairwise relationship with the input character or graphic.

In this case, it is preferable that the label creating apparatus further include a rewrite unit to allow rewriting the second character or graphic selected with the selection unit. It is also preferable that the printing unit print the first character or graphic that has been input and the second character or graphic rewritten with the rewrite unit.

Under this configuration, it is possible to create a pair of labels that has a desired pairwise relationship by rewriting the second character or graphic that has been selected even though the second character or graphic that is desired is not included in the second character or graphic that has been selected.

In this case, it is preferable that the second character or graphic rewritten with the rewrite unit be associated with the first character or graphic that has been input and memory in the memory unit.

Under this configuration, the second character or graphic that has been rewritten is associated and memory with the first character or graphic that has been input; therefore, it is possible to display the second character or graphic that has been rewritten as an option next time the first character or graphic is input.

Preferably, in this case, the pair of labels are affixed at both ends of a cable; the input unit inputs for the first character or graphic first connection point information indicating a first connection point that is one of both connection points to which the cable is connected, and a second connection point information indicating a second connection point that is the other of the connection points to which the cable is connected; and the printing unit prints for the first character or graphic the first connection point information in a highlighted manner as compared with the second connection point information, and for the second character or graphic the second connection point information in a highlighted manner as compared with the first connection point information.

Under this configuration, the first connection point information and the second connection point information indicating both the connection points to which the cable is connected are input; subsequently, the first connection point information and the second connection point information are printed to be individually highlighted, the pair of cable labels thereby created. With the pair of cable labels affixed on areas on the cable that are close to their corresponding connection points, the user can recognize the respective connection points by referring to only one cable label. This makes it easy to create a pair of cable labels because there is no need to input the first connection point information or second connection point information for each cable label.

In this case, it is preferable that the printing unit apply to at least one of the first connection point information and the second connection point information style processing to highlight the first connection point information in comparison to the second connection point information for the first character or graphic and style processing to highlight the second connection point information in comparison to the first connection point information for the second character or graphic before printing.

Alternatively in this case, it is preferable that the printing unit print a first emphasis mark image to highlight the first connection point information in comparison to the second connection point information for part of the first character or graphic, and a second emphasis mark image to highlight the second connection point information in comparison to the first connection point information for part of the second character or graphic.

Under this configuration, it is possible to achieve highlighting with a simple process; applying style processing to highlight the first connection point information or second connection point information, and adding an emphasis mark image for highlighting. Thus, the user can easily identify the connection point corresponding to an end of the cable.

In this case, it is preferable that the first emphasis mark image be an arrow that starts from the second connection point information and points to the first connection point information, and the second emphasis mark image be an arrow that starts from the first connection point information and points to the second connection point information.

Under this configuration, it is possible to highlight one connection point information in comparison to the other connection point information in another manner using an arrow, which makes it easy for the user to identify the connection point corresponding to an end of the cable. Shapes of arrows are not limited as long as they can point to the targets and provide their orientations; for example, they may be triangles or images of a hand with a forefinger sticking out.

A computer program according to yet another aspect of the invention causes a computer to perform each process included in the method for controlling the label creating apparatus.

Under this configuration, it is easy to perform the respective processes only with the program installed on the computer.

BRIEF DESCRIPTION OF THE DRAWINGS

The invention will be described with reference to the accompanying drawings, wherein like numbers reference like elements.

DESCRIPTION OF EXEMPLARY EMBODIMENTS

A tape printing apparatus (label creating apparatus) according to one embodiment of the invention will be described hereinafter, referring to the accompanying drawings. The tape printing apparatus creates display labels on which printing data is printed, and more specifically a pair of labels on which characters or graphics having a pairwise relationship are respectively printed (hereinafter called "a set of paired labels"). For example, it creates a set of paired labels that has "PUSH" printed on one thereof and "PULL" printed on the other, or that has "ON" printed on one thereof and "OFF" printed on the other. "Graphics" referred to herein include symbols.

Figure 1:
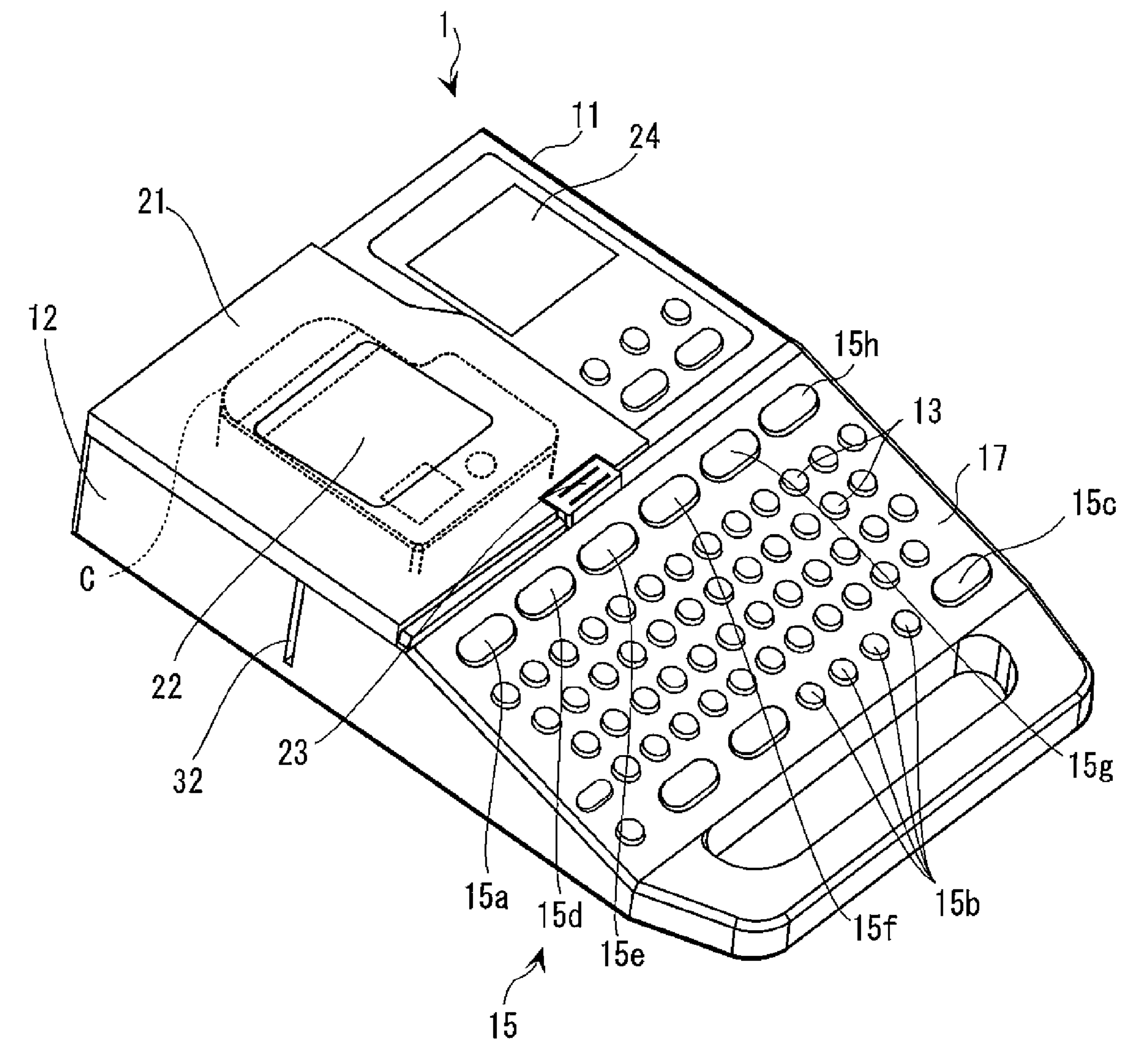
FIG. 1 is an external perspective view of a tape printing apparatus according to one embodiment of the invention with its lid closed.
Figure 2:
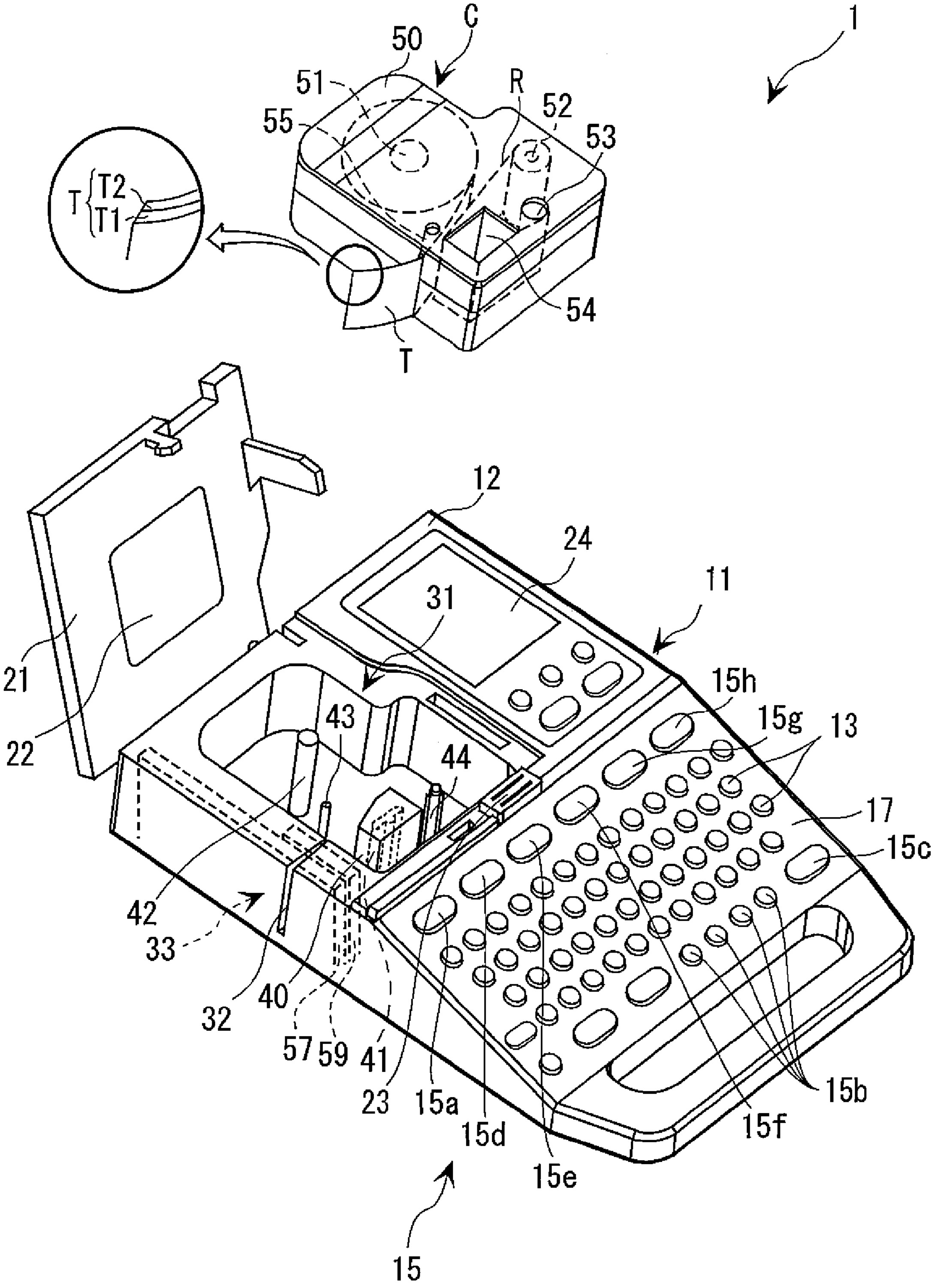
FIG. 2 is an external perspective view of the tape printing apparatus according to the embodiment with its lid open.

As shown in FIGS. 1 and 2, a tape printing apparatus 1 includes an apparatus body 11 for performing a printing process on a printing tape T, and a tape cartridge C that accommodates the printing tape T and an ink ribbon R and is removably mounted in the apparatus body 11.

The apparatus body 11 has an exterior that is formed of a printer case 12. Disposed on the front half of the upper surface of the printer case 12 is a keyboard 17 including a plurality of character input keys 13 for inputting characters and the like, and a plurality of function keys 15 for performing various selection, enter and other processes. The function keys 15 include a form key 15*a* for setting a printing form, up and down (left and right) arrow keys 15*b* for selecting from options displayed on a display 24 that is described below, an enter key 15*c* for confirming an option (character string) selected from the options, a delete key 15*d* for deleting characters or the like during an input and edit, a conversion key 15*e* for converting characters during an input and edit, a mode key 15*f* for setting a character mode, a print key 15*g* for commanding a printing process, and a shift key 15*h* for suppressing an increase in keys to be operated.

An open/close lid 21 is provided to widely cover the rear half of the left upper surface of the printer case 12. A viewing window 22 to allow visually confirming whether the tape cartridge C is mounted or not is formed on the upper surface of the open/close lid 21. A lid release button 23 for releasing the open/close lid 21 is provided on the front side thereof. A display 24 for displaying results input with the keyboard 17 and the like is formed on the rear half of the right upper surface of the printer case 12.

As the open/close lid 21 released by pushing the lid release button 23, a cartridge mounting section 31 for mounting the tape cartridge C is formed as an indentation inside. A printing head 41 for performing a printing process on the printing tape T to be reeled out of the tape cartridge C is disposed in the cartridge mounting section 31 (see FIG. 2).

On the left surface of the printer case 12, a tape ejection slot 32 is formed to communicate the cartridge mounting section 31 with the exterior of the printer. A cutting section 33 for cutting the printing tape T is embedded to face the tape ejection slot 32. Though omitted from FIGS. 1 and 2, a circuit board constituting a controller 64 (see FIG. 3) for exercising integrated control over the apparatus body 11 is equipped inside the printer case 12.

In the cartridge mounting section 31, the printing head 41, a positioning boss 42, a platen drive shaft 43, and a take-up drive shaft 44 are protrusively provided. The printing head 41 has a heating element, and is covered with a head cover 40. The positioning boss 42 positions a tape reel 51 that is included in the tape cartridge C as described below. The platen drive shaft 43 functions to reel out the printing tape T and ink ribbon R, and faces the printing head 41. The take-up drive shaft 44 takes the ink ribbon R up. The cartridge mounting section 31 is provided with a tape discriminating sensor (not shown) for dealing with a plurality of apertures to be detected that are formed on the back surface of the cartridge case 50. Also the cartridge mounting section 31 incorporates a printing feeder motor 46 (see FIG. 3) for driving the platen drive shaft 43 and take-up drive shaft 44, a speed reduction gear train (not shown) and others.

The tape cartridge C accommodates the tape reel 51 that has the printing tape T wound thereon inside the cartridge case 50. The tape cartridge C also accommodates a ribbon feeding reel 52 and a ribbon take-up reel 53 that have the ink ribbon R wound thereon in the lower right. A through hole 54 in which the head cover 40 covering the printing head 41 is inserted is formed to the lower left of the tape reel 51. A platen roller 55 is disposed in an area in which the printing tape T and ink ribbon R overlap to be fitted with the platen drive shaft 43 and rotationally driven.

When the tape cartridge C is mounted in the cartridge mounting section 31, the through hole 54 is inserted in the head cover 40, the tape reel 51 in the positioning boss 42, the ribbon take-up reel 53 in the take-up drive shaft 44, and the platen roller 55 is in the platen drive shaft 43. When the open/close lid 21 is closed under this condition, the printing head 41, in response thereto, comes into contact with the platen roller 55 with the printing tape T and ink ribbon R sandwiched therebetween and gets put on standby for printing. With the platen drive shaft 43 and take-up drive shaft 44 synchronously rotating to feed the printing tape T and ink ribbon R, the printing head 41 performs a printing process based on printing data generated by a printing data generating program 73 (see FIG. 3). Simultaneously, the ink ribbon R reeled out of the ribbon feeding reel 52 is reeled in on the ribbon take-up reel 53 after orbiting around an opening wall of the through hole 54.

The printing tape T comes in a plurality of different tape types (tape widths, tape colors, ink ribbon colors and tape materials), formed of a record tape T1 whose back side is coated with an adhesive layer and a release tape T2 that is applied on the record tape T1 with the adhesive layer. The printing tape T is wound into a roll with the record tape T1 outward and with the release tape T2 inward, accommodated in the cartridge case 50. It is possible to discriminate these tape types using the tape discriminating sensor (not shown) to detect a plurality of small apertures (not shown) to be detected that are formed on the back surface of the cartridge case 50.

Figure 3:
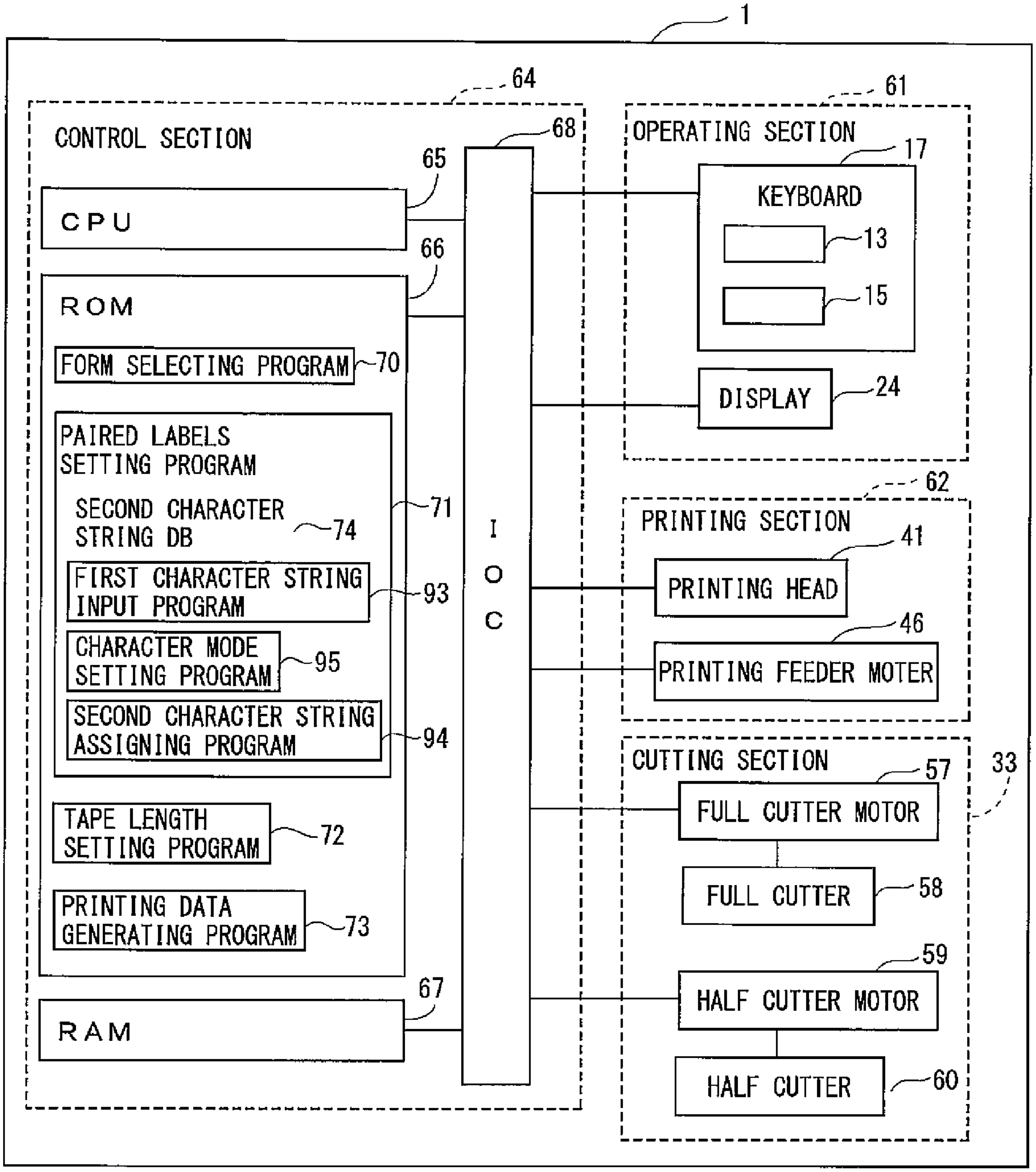
FIG. 3 is a control block diagram of the tape printing apparatus.

A control system of the tape printing apparatus 1 will be described hereinafter, referring to the control block diagram shown in FIG. 3. The tape printing apparatus 1 includes an operating section 61 to function as user interface for inputting data with various keys on the keyboard 17, displaying printing data and the like on the display 24, or conducting any other operation; a printing section (printing unit) 62 to perform printing on the printing tape T, the cutting section 33 to cut the printing tape T, and a control section 64 to control the entire tape printing apparatus 1, connected to these sections of the tape printing apparatus 1.

The cutting section 33 includes a full cutter 58 for fully cutting the printing tape T, a full cutter motor 57 for driving the full cutter 58, a half cutter 60 for cutting only the record tape T1 of the printing tape T, and a half cutter motor 59 for driving the half cutter 60. A full cut is a cutting process in which the record tape T1 and release tape T2 of the printing tape T are both cut. Labels are created by fully cutting in a given tape length the printing tape T on which printing has been made. On the other hand, a half cut is a cutting process in which only the record tape T1 is cut. When a set of paired labels 81 is created, for example, a half cut is made between labels (in an area in which first printing data 76 and the second printing data 77 adjoin as described below), which allows leaving the set of paired labels 81 connected by the release tape T2.

Based on printing data generated by the printing data generating program 73 and a tape length set by a tape length setting program 72 as described below, the printing section 62 performs a printing process on the printing tape T with the printing head 41.

The control section 64 includes a central processing unit (CPU) 65, a read only memory (ROM) 66 for memorizing control programs to perform various control processes with the CPU 65, a random access memory (RAM) 67 to serve as an operating region for various control processes, an input output controller (IOC) 68 for performing input and output of input data and control signals from and to the sections of the tape printing apparatus 1; these are connected with one another by internal buses. Based on the control programs in the ROM 66, the CPU 65 inputs various signals and data from the sections of the tape printing apparatus 1 via the IOC 68. Based on the various input signals and data, the CPU 65 processes various data memory in the RAM 67 and outputs various signals and data to the sections of the tape printing apparatus 1 via the IOC 68 to control a printing process.

The ROM 66 memories therein a form selecting program 70 and paired labels setting program 71, and the tape length setting program 72 and printing data generating program 73.

Figure 4A:
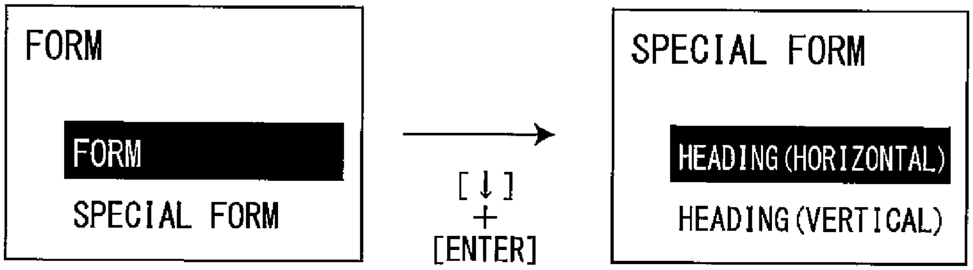
FIGS. 4A to 4E are diagrams showing various selection views and input views displayed of the tape printing apparatus.

The form selecting program 70 is a program for selecting a printing form to be printed on labels. Categorized into “Form” and “Special Form”, the printing form is a layout (including the number of lines, a character size and style type) that reflects usage or the like. The CPU 65 executes the form selecting program 70 to display on the display 24 a selection view to allow selecting “Form” or “Special Form”. When a user selects “Form”, the CPU 65, in response thereto, displays on the display 24 a selection view having options such as “A4 File”, “B5 File”, “CD Case” and “FD/MO.” When the user selects “Special Form”, meanwhile, it displays on the display 24 a selection view to allow selecting options such as “Heading (vertical)”, “Heading (horizontal)”, “Portrait with Horizontal Writing”, “Landscape with Vertical Writing”, “For Cable”, “Pair for Cable” and “Paired Labels” (see FIG. 4A). Thus, the user may select a desired printing form “Paired Labels” is selected to create a set of paired labels 81.

The paired labels setting program 71 is a program for setting contents to be printed on a set of paired labels 81 when “Paired Labels” is selected in the form selection view. The paired labels setting program 71 includes a second character string database (memory unit and memory section) (hereinafter called “second character string DB”) 74, a first character string input program 93, a character mode setting program 95 and a second character string assigning program 94.

The second character string DB 74 is a database for memorizing one or more character strings that correspond to each character string input at the operating section 61. In other words, the second character string DB 74 associates and memorizes any character string with one or more character strings that have a pairwise relationship with the character string. For example, it associates and memorizes two character strings “PULL” and “RETURN” with a character string “PUSH”.

Figure 4B:
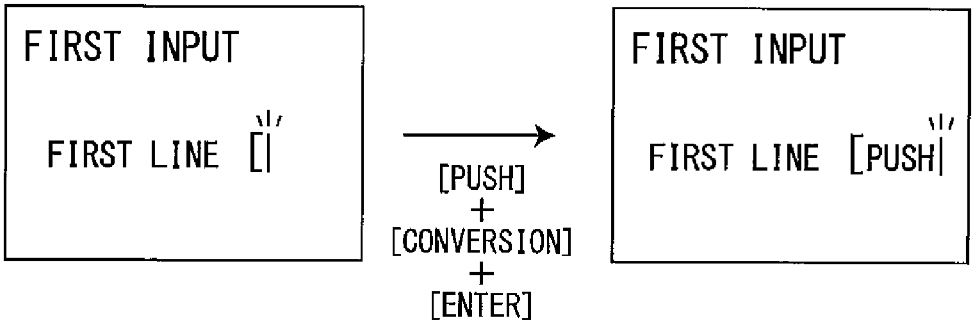

The first character string input program 93 uses the CPU 65 to display on the display 24 an input view (see FIG. 4B) to allow inputting a first character string (that is referred to as a first character or graphic in the appended claims), prompting the user to input the first character string. In other words, the user uses the input view displayed on the display 24 and the keyboard 17 to input the first character string. An input unit and input section to be referred to in the appended claims are formed of the display 24, keyboard 17 and control section 64 in this embodiment.

Figure 4C:
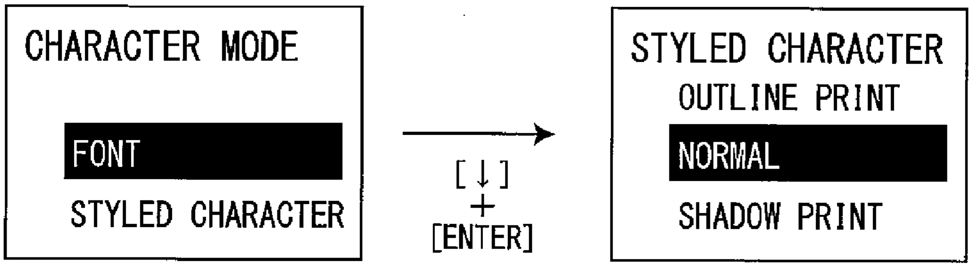

The character mode setting program 95 is a program for setting a character mode for the first character string. The CPU 65 executes the character mode setting program 95 to display on the display 24 a selection view to allow selecting from main items on the character mode, such as “Font”, “Styled Character” and “Italics/Emphasis”, when the mode key 15*f* is pressed during the input and edit of the first character string. When the user selects a desired item, the CPU 65, in response thereto, displays on the display 24 a selection view to allow selecting from subitems under the item. When “Styled Character” is selected, for example, a selection view to allow selecting from subitems under “Styled Character”, such as “Outline Print”, “Normal” and “Shadow Print”, is displayed (see FIG. 4C). Style information may be input by setting a character mode using such selection views. As described in detail below, style information input at this moment is applied to a second character string as well as the first character string.

Figure 4D:
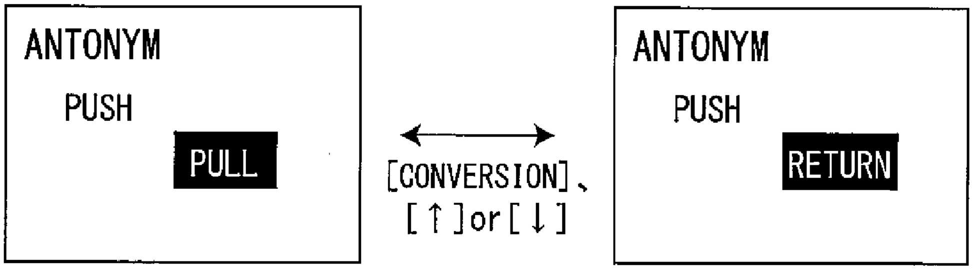
Figure 4E:
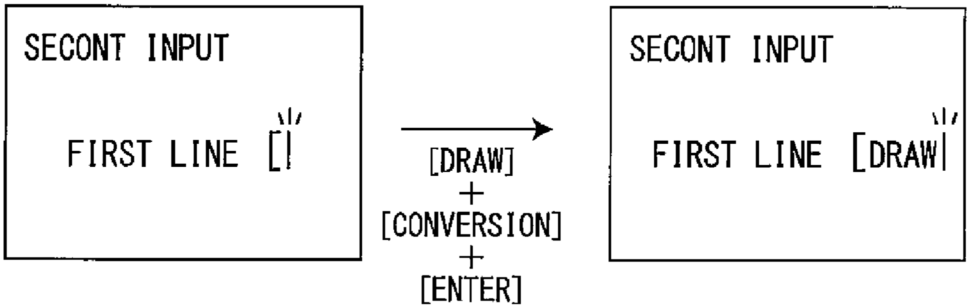

The second character string assigning program 94 is a program for assigning (selecting and inputting) the second character string that (is referred to as a second character or graphic in the appended claims and) has a pairwise relationship with the input first character string. The CPU 65 executes the second character string assigning program 94 to read out of the second character string DB 74 one or more character strings that have a pairwise relationship with the input first character string. To promote the user to select the second character string, the CPU 65 subsequently displays on the display 24 a selection view that (is shown in FIG. 4D and) shows options: one or more character strings that have been read out. An input view (see FIG. 4E) to allow inputting a character string desired by the user for the second character string is also displayed on the display 24, providing a configuration in which the user may input the second character string. Thus, a display unit and display section to be referred to in the appended claims are formed of the display 24 and control section 64; the selection unit referred to in the appended claims are formed of the keyboard 17 in this embodiment.

The printing data generating program 73 is a program for generating printing data. Based on the input character string, the CPU 65 executes the printing data generating program 73 to generate printing data. When a set of paired labels 81 is created, the first printing data 76 is generated based on the input first character string; the second printing data 77 is generated based on the selected or input second character string. When style information is input with the first character string, the second character string is styled based on the input style information; subsequently, the first printing data 76 and the second printing data 77 are generated.

Figure 5A:
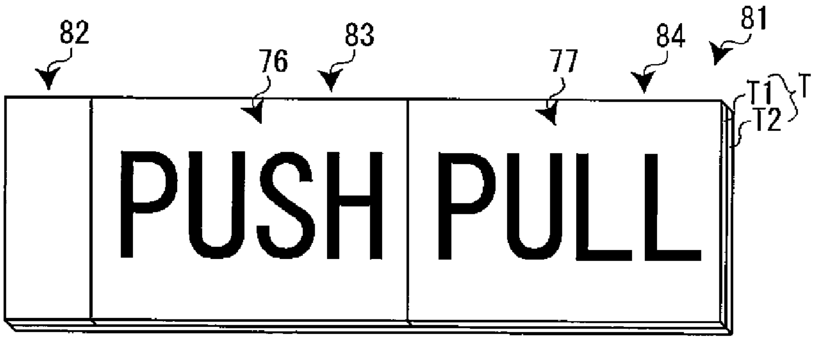
FIGS. 5A to 5D are views showing examples of created sets of paired labels.
Figure 5B:
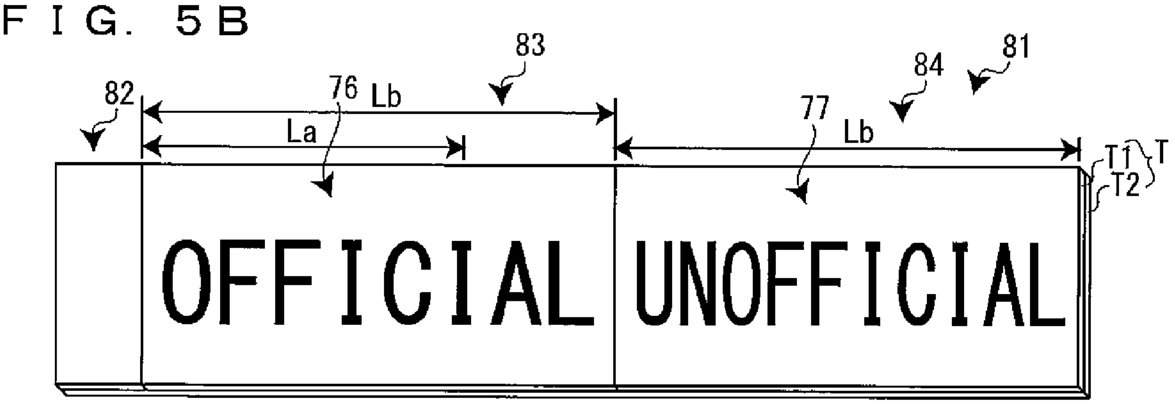

The tape length setting program 72 is a program for setting the tape length of a label to be created. Based on the printing data generated by the printing data generating program 73, the CPU 65 executes the tape length setting program 72 to set the tape length of a label to be created. When a set of paired labels 81 is created, the CPU 65 compares the tape length La of the generated first printing data 76 with the tape length Lb of the generated second printing data 77 to set the tape length according to the longer of them. When the first printing data 76 based on the first character string “Official” and the second printing data 77 based on the second character string “Unofficial” are generated as shown in FIG. 5B, for example, the second printing data 77 has a longer tape length; therefore, the tape length of a first label 83 is set to the tape length of a second label 84. Thus, it is possible to create a nice-looking set of paired labels 81 that shares the same tape length by uniforming the tape lengths. It is also possible to fit the printing data 76 and 77 both into the tape length without any problem because the tape length is set according to the longer of the two tape lengths.

A set of paired labels 81 to be created by the tape printing apparatus 1 will be described hereinafter, referring to FIGS. 5A to 5D. FIG. 5A shows an example of a set of paired labels 81 to be created. As shown in FIG. 5A, a set of paired labels 81 is output in such a state that an allowance 82 for release, the first label 83 with the first printing data 76 printed thereon, and the second label 84 with the second printing data 77 printed thereon are connected. In other words, the allowance 82 for release, the first label 83 and the second label 84 constitute a set of a pair label 81 in order from left to right; a half cut has been made between them, and a full cut has been made at the left end of the allowance 82 for release and at the right end of the second label 84. The first printing data 76 includes the first character string, while the second printing data 77 includes the second character string. The first character string and the second character string, therefore, are printed to adjoin. FIG. 5B shows a printing example for a set of paired labels 81 created to share the same tape length by uniforming the tape lengths of the first label 83 and the second label 84.

When the record tape T1 of the first label 83 is used, it is released from the release tape T2 using the allowance 82 for release; subsequently, the record tape T1 is affixed on a desired place. When the record tape T1 of the second label 84 is used, it is released and obtained from the release tape T2 using the first label 83 forming portion as an allowance for release; subsequently, the record tape T1 is affixed on a desired place.

Figure 5C:
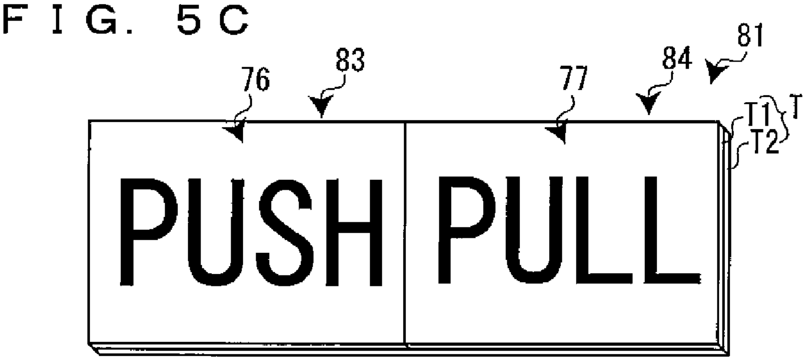
Figure 5D:
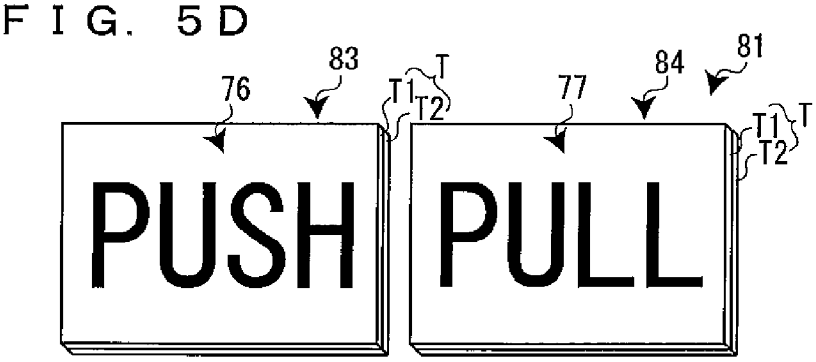

FIG. 5C shows a configuration of the first label 83 and the second label 84 output to be connected with the allowance 82 for release omitted. FIG. 5D shows a configuration of the first label 83 and the second label 84 output after a full cut is made therebetween. In this case, a half-cut portion may be omitted.

Figure 6:
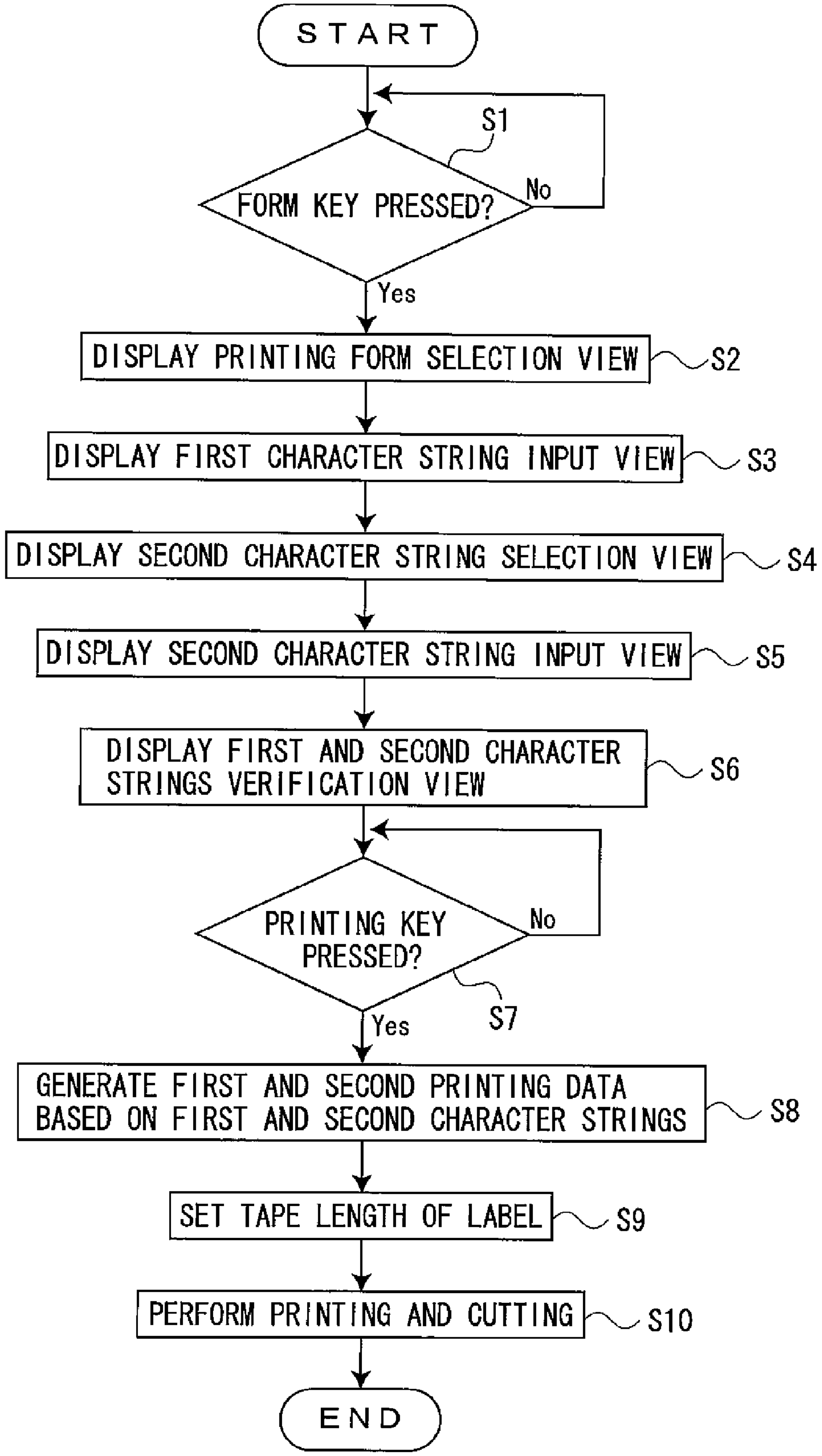
FIG. 6 is a flowchart showing a creation process for creating a set of paired labels in the tape printing apparatus.

A process for creating a pair of labels in the tape printing apparatus 1 will be described hereinafter, referring to FIGS. 6 to 8. A situation to create the labels shown in FIG. 5A will be exemplified below. Firstly, a form key 15*a* is pressed by the user as shown in FIG. 6 (S1: Yes). In response thereto, the CPU 65 uses the form selecting program 70 to display the printing form selection view (S2) (FIG. 7: D1). In the embodiment, it is assumed that the user has selected "Special Form" in the selection view and subsequently selected "Paired Labels" (FIG. 7: D2 and D3).

Figure 7:
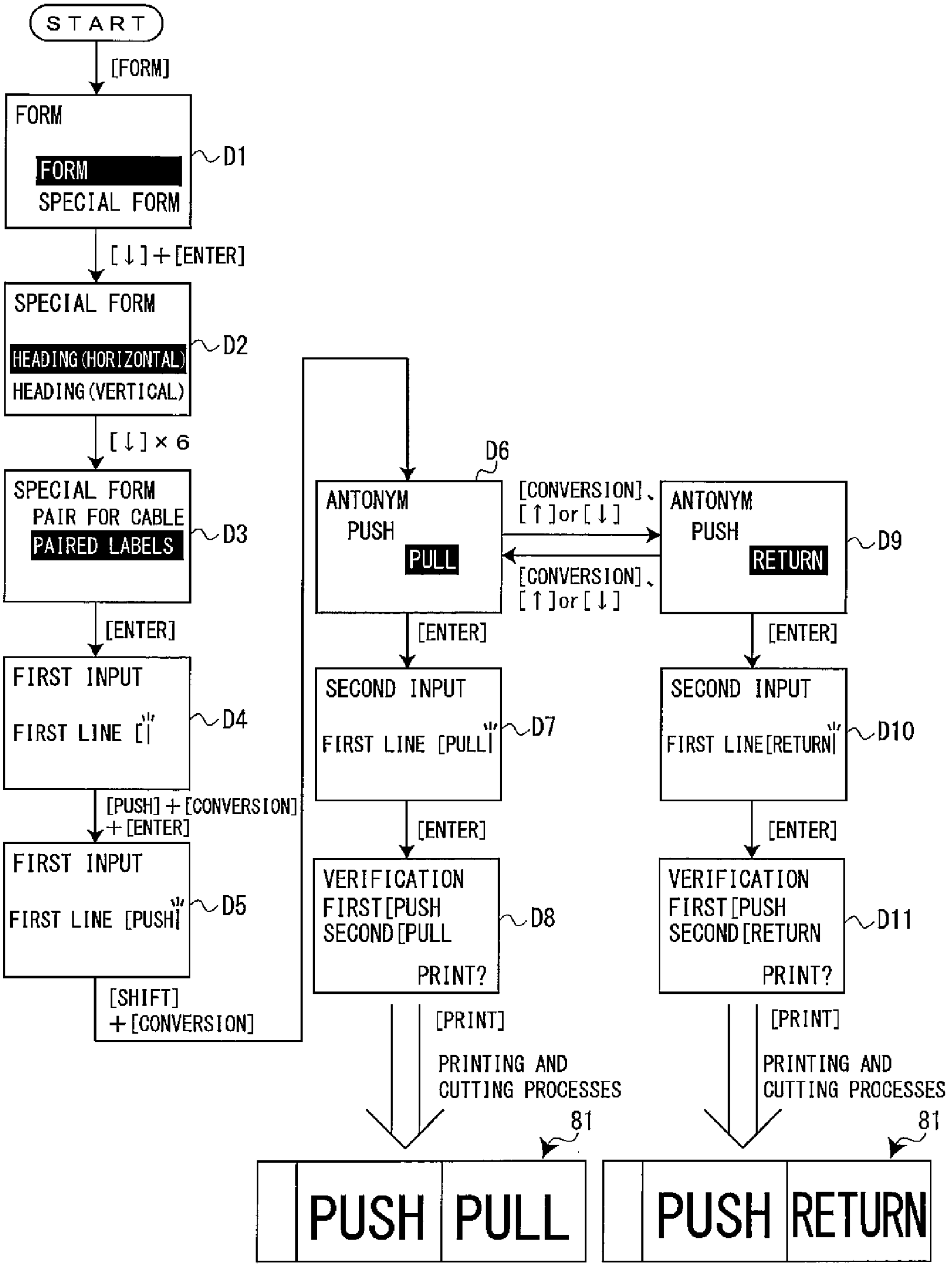
FIG. 7 is a diagram of successive views displayed in the creation process for creating a set of paired labels in the tape printing apparatus.
Figure 8:
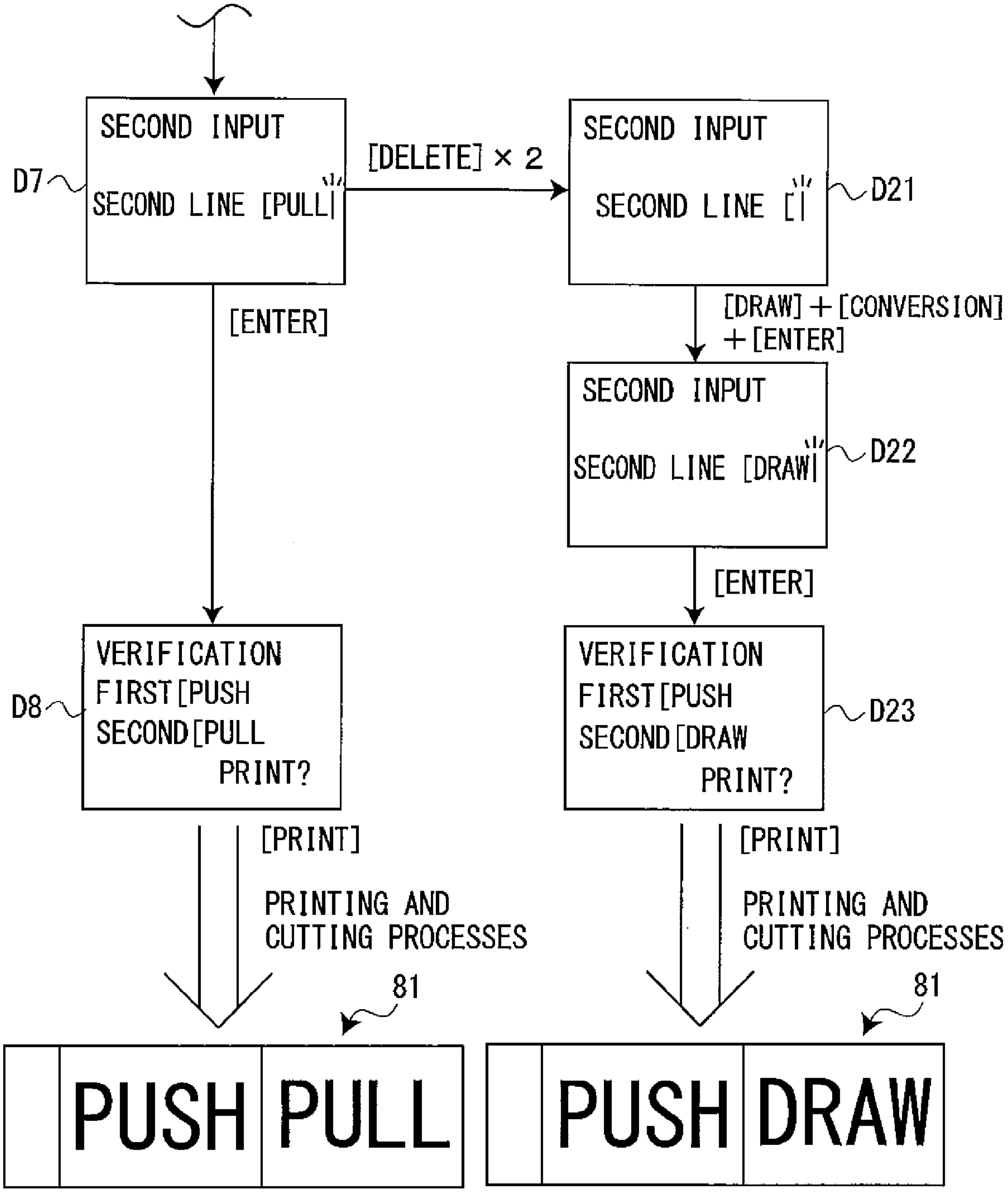
FIG. 8 is a diagram of successive views displayed in an input process for inputting a second character string.

When "Paired Labels" is selected, the CPU 65 uses the first character string input program 93 to display the first character string input view (S3) (FIG. 7: D4). In the embodiment, it is assumed that the user has input "PUSH" (FIG. 7: D5). Subsequently, the user's presses of the shift key 15*h* and conversion key 15*e* trigger a transition to the next process. As described in detail below, it is possible to make a transition to a style setting process (see FIG. 9) to determine a style setting by pushing the mode key 15*f* during the input and edit of the first character string.

When the shift key 15*h* and conversion key 15*e* are pressed, the CPU 65, in response thereto, uses the second character string assigning program 94 to read out of the second character string DB 74 one or more character strings that have a pairwise relationship with the input first character string, and to display those options in a selection view (S4) (FIG. 7: D6 and D9). When one character string is selected by the user at this moment, a transition to the next process (S5) is made. When the second character string DB 74 memorizes only one character string that has a pairwise relationship with the input first character string, the single character string is displayed in the selection view. When the user presses the enter key 15*c* under this condition, the single character string is confirmed; subsequently, a transition to the next process (S5) is made. When there is only one character string that has a pairwise relationship as shown above, an enter operation (a press of the enter key 15*c*) is conducted instead of a selection operation. At this moment, it is possible to omit the enter operation and make an automatic transition to the next process (S5) a certain time period after the single character string is displayed in the selection view. It is also possible to omit to display the single character string in the selection view (S4), thereby making a transition to the next process (S5).

When a character string is selected as the second character string, the CPU 65, in response thereto, uses the second character assigning program 94 to display the selected second character string to be edited in an input view (S5) (FIG. 7: D7 and D10). When the enter key 15*c* is subsequently pressed, the CPU 65 confirms the second character string in response thereto. The user may also input the second character string that is desired and not included in options in the selection view before pressing the enter key 15*c* in the second character string input view. When the second character string input view is displayed, for example, "PULL" that has been selected is removed by pressing the delete key 15*d* (D21) to input "DRAW" (D22), as shown in FIG. 8. "DRAW" that is not included in the options is thereby displayed. When the enter key 15*c* is subsequently pressed, the CPU 65 confirms that "DRAW" is the second character string. Thus, a rewrite unit to be referred to in the appended claims is formed of the keyboard 17 and control section 64 in this embodiment. In this case, the rewritten second character string is memory in the second character string DB 74. When the enter key 15*c* is pressed after the rewrite of the selected second character string, more precisely, the rewritten second character string is associated with the input first character string and memory in the second character string DB 74.

When the second character string is confirmed, the CPU 65 displays a verification view for the first character string and the second character string (S6) (FIG. 7: D8 and D11). When the print key 15*g* is pressed under this condition (S7: Yes), the CPU 65 uses the printing data generating program 73 to generate the first printing data 76 based on the input first character string, and to generate the second printing data 77 based on the assigned (selected or input) second character string. When the first printing data 76 and the second printing data 77 are generated, the CPU 65 uses the tape length setting program 72 to set the tape lengths of the first label 83 and the second label 84 based on the first printing data 76 and the second printing data 77.

Lastly, the CPU 65 uses the printing section 62 to print the first printing data 76 and the second printing data 77. Further, it uses the cutting section 33 to make a half cut in the area in which the first printing data 76 and the second printing data 77 adjoin on the printing tape T, and to make a full cut in the printing tape T in such a manner that it is cut in the set tape length. Thereby created is a set of paired labels 81 that has the first printing data 76 printed on one thereof and the second printing data 77 printed on the other as shown in FIG. 5A.

Figure 9:
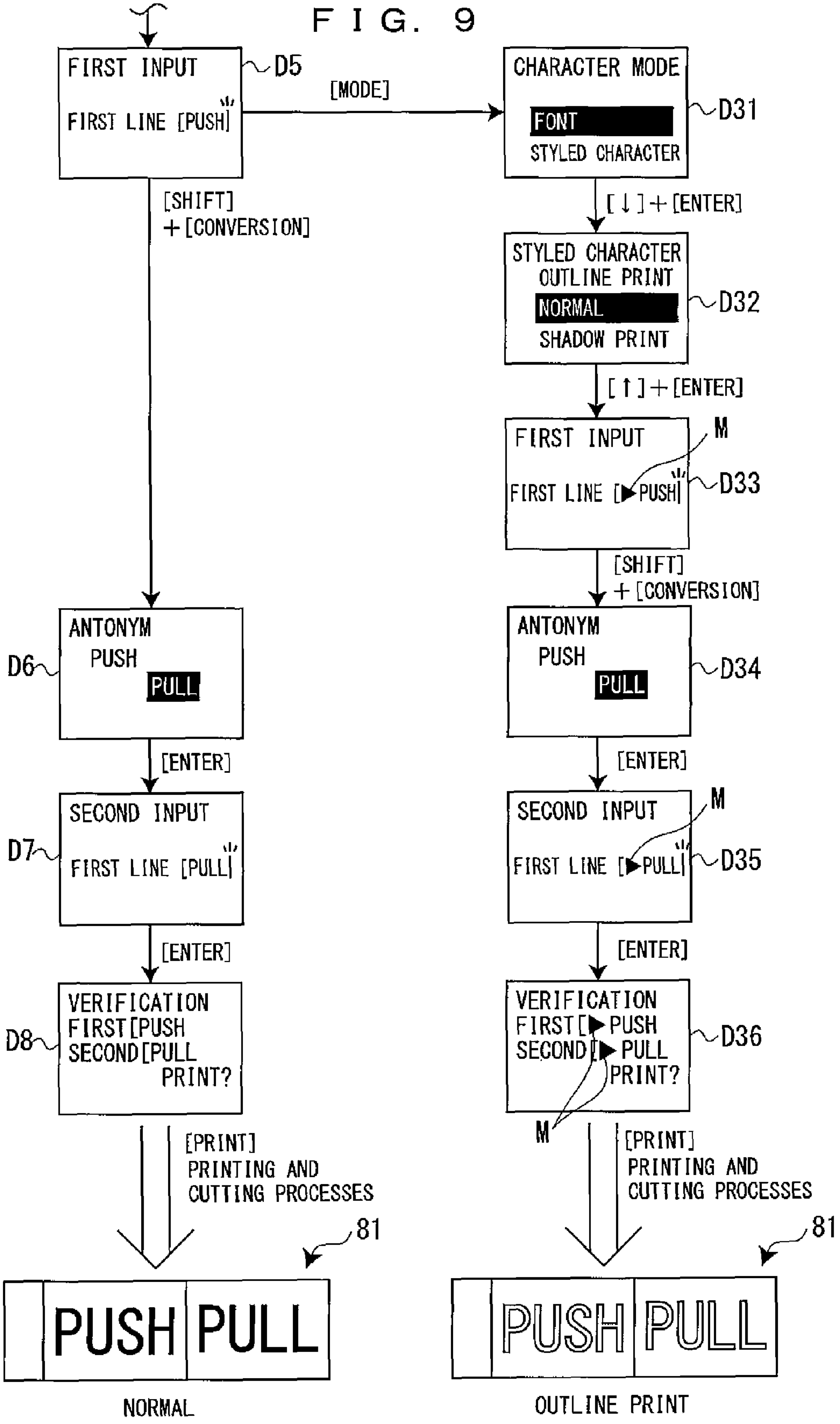
FIG. 9 is a diagram of successive views displayed in a style setting process.

A style setting process will be described hereinafter, referring to FIG. 9. When the mode key 15*f* is pressed during the input and edit of the first character string (while the first character string input view is displayed), the CPU 65 uses the character mode setting program 95 to display the selection view to allow selecting from the main items on the character mode, as shown in FIG. 9 (D31). It is assumed that the user has selected "Styled Character" in response thereto in the embodiment.

When the main item is selected, the CPU 65 uses the character mode setting program 95 to display a selection view to allow selecting from the subitems under the selected main item (D32). The user selects a subitem in the selection view, thereby inputting style information. In the embodiment, it is assumed that the user has selected "Outline Print". When the subitem is selected, the first character string input view is displayed to return to the input and edit of the first character string (D33). At this moment, a style setting mark M for showing that a style setting has been determined is displayed before the input character string, as shown in FIG. 9.

Subsequently, the CPU 65 displays the second character string selection view and input view (D34 and D35); and displays the verification view for the first character string and the second character string when the second character string is assigned (D36). When the print key 15*g* is pressed under this condition, the CPU 65 adds the input style information using the printing data generation program 73 to generate the first printing data 76 and the second printing data 77. Subsequently, the printing section 62 and cutting section 33 perform a printing process of the printing data 76 and 77 and cutting processes. Thereby created is a set of paired labels 81 that has been given the style ("Outline Print") based on the input style information.

Under this configuration, it is easy to style the first character string and the second character string by inputting style information to the first character string only. It is also possible to create a nice-looking set of paired labels 81 because the same style can be given to the first character string and the second character string. A configuration under which the first label 83 and the second label 84 have different style settings to be given different styles may be adopted. A configuration that allows determining whether the same style or different styles are given may also be adopted. Further, it may be possible to create a label on which multiple languages are printed. For example, on the first line of the label, a word in one language may be printed at a left side and its' antonym may be printed at a right side. On the second line of the label, another word in another language corresponding to the word in one language may be printed at the left side (and below the word) and an antonym of another word may be printed at the right side (and below the antonym of the word).

According to the embodiment, the configuration allows selecting the desired second character string from one or more displayed second character strings after the input of the first character string; however, selection of the second character string may be omitted from the configuration. Creation operations for creating a set of paired labels under another modification of the embodiment will be described hereinafter, referring to FIG. 10.

Figure 10:
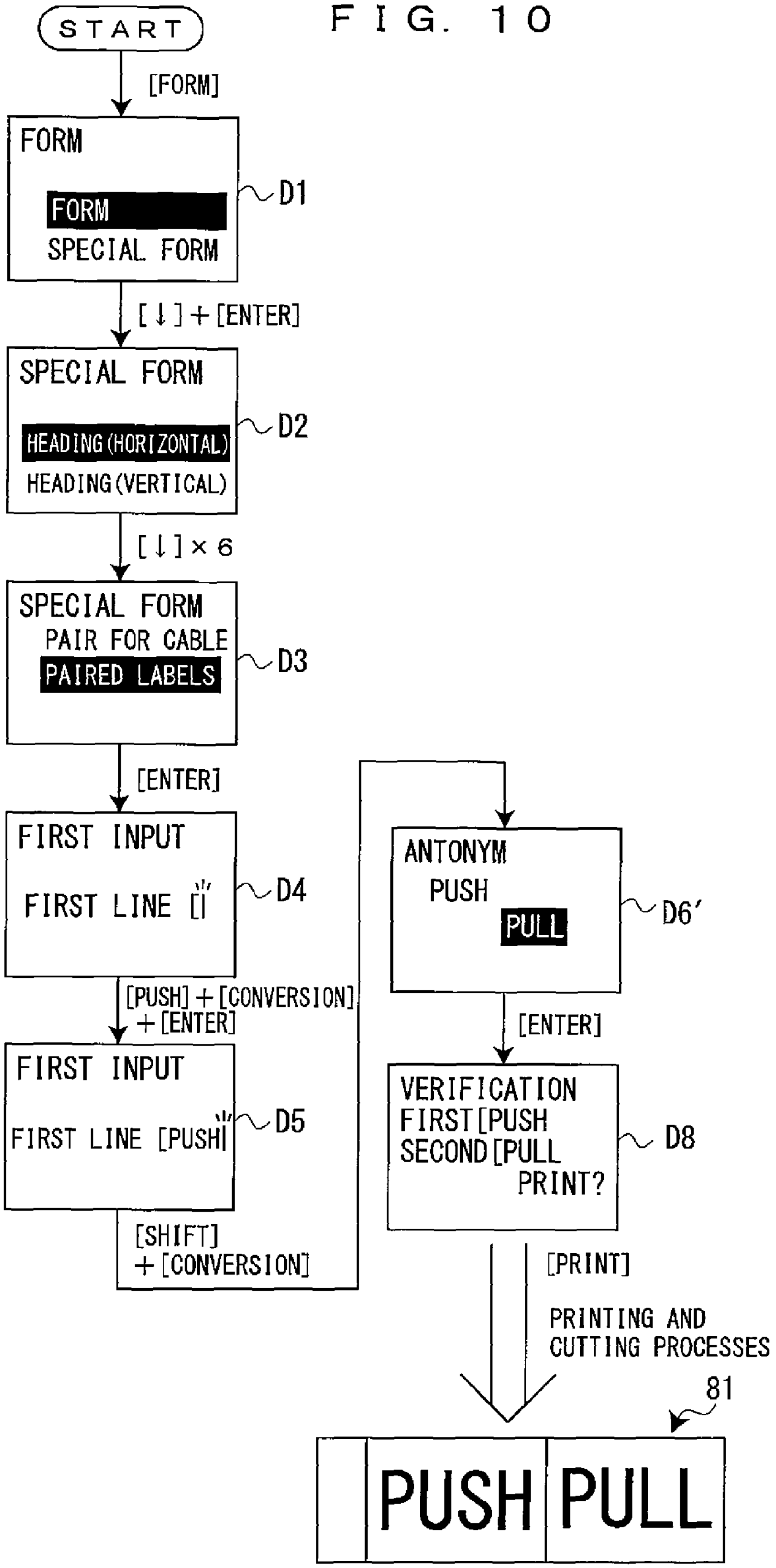
FIG. 10 is a diagram of successive views displayed in a modified version of the embodiment in the creation process for creating a set of paired labels.

As shown in FIG. 10, operations to be conducted by the time when the first character string is input (D1 to D5) are the same as the operations shown in FIG. 7. When the shift key 15*h* and conversion key 15*e* are pressed after the input of the first character string, the CPU 65 reads out of the second character string DB 74 the second character string corresponding to the input first character string to display it (D6'). When the enter key 15*c* is subsequently pressed, the CPU 65 displays a verification view (D8). When the print key 15*g* is pressed under this condition, the CPU 65 executes a printing process. When a plurality of second character strings corresponding to the input first character string are memorized in the second character string DB 74 at this moment, the plurality of second character strings are all displayed and printed on the second label 84. Instead, a configuration under which the plurality of second character strings are all displayed to create a plurality of second labels 84 each of which has one of the second character strings printed thereon may be adopted. A configuration under which one of the plurality of second character strings that has the highest priority is displayed and printed on the second label 84 may be adopted alternatively. A configuration that allows omitting to display the verification view (D8) and executing a printing process when the print key 15*g* is pressed with the second character string displayed (D6') may also be adopted.

Figure 11A:
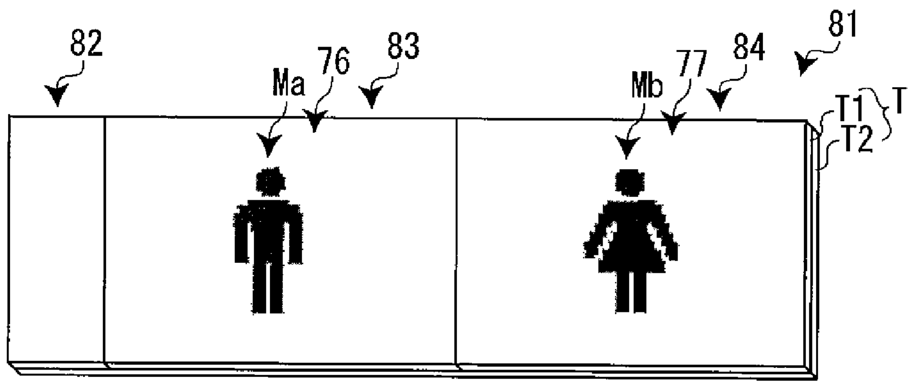
FIGS. 11A and 11B are views showing modified examples of created sets of paired labels.
Figure 11B:
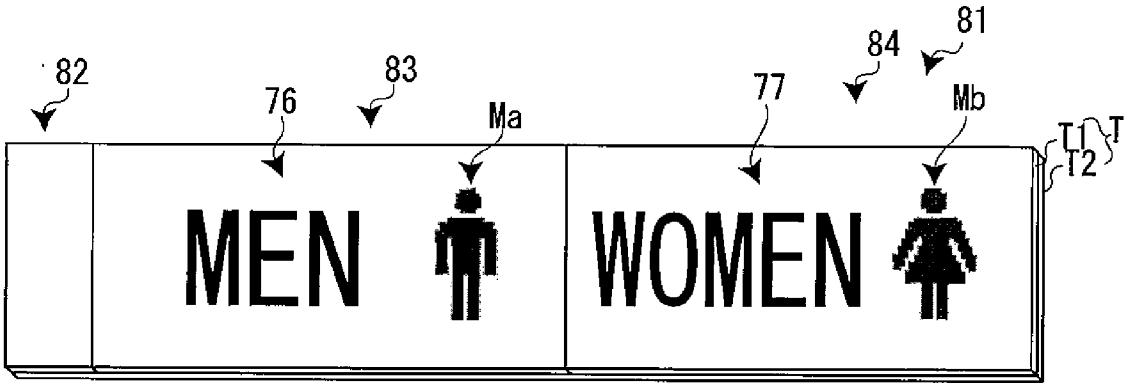

According to the above-described embodiment, a character string is used as "a character or graphic" to be referred to in the appended claims. Instead of a character string, a graphic may be input to print the input graphic and another graphic that has a pairwise relationship therewith for creation of a set of paired labels 81. For example, this may be a configuration that allows printing a mark Ma indicating a man on the first label 83 and a mark Mb having a pairwise relationship thereto and indicating a woman on the second label 84 to create a set of paired labels 81 (see FIG. 11A) when the mark Ma indicating a man is input. A configuration under which a character string and graphic are input instead of just a character string to print one set made of the character string and the graphic that have been input and another set made of a character string and graphic that have a pairwise relationship therewith for creation of a set of paired labels 81 may also be adopted. For example, this may be a configuration that allows printing a character string, "MEN" and a mark Ma indicating a man on the first label 83 and a character string, "WOMEN" and a mark Mb indicating a woman on the second label 84 to create a set of paired labels 81 (see FIG. 11B) when the character string, "MEN" and the mark Ma indicating a man are input.

According to the embodiment, the configuration allows the tape length setting program 72 to set as the tape lengths of the first label 83 and the second label 84 the longer of the tape length La of the first printing data 76 to be printed and the tape length Lb of the second printing data 77 to be printed. However, a configuration that allows setting the tape length of the first label 83 based on the first printing data 76 and the tape length of the second label 84 based on the second printing data 77 so that the tape lengths of the first label 83 and the second label 84 will be different may be adopted.

A tape printing apparatus 1 according to a second embodiment of the invention and, more specifically, parts different from those in the tape printing apparatus 1 according to the first embodiment, will be described hereinafter. The tape printing apparatus 1 creates a pair of cable labels to be affixed on both ends of a cable 10 by printing a predetermined printing data on a special printing tape T.

Figure 12A:
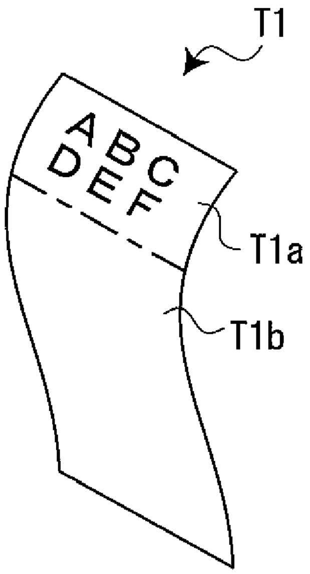
FIG. 12A to 12C are external perspective views showing examples of a cable label that is created out of a special printing tape.
Figure 12B:
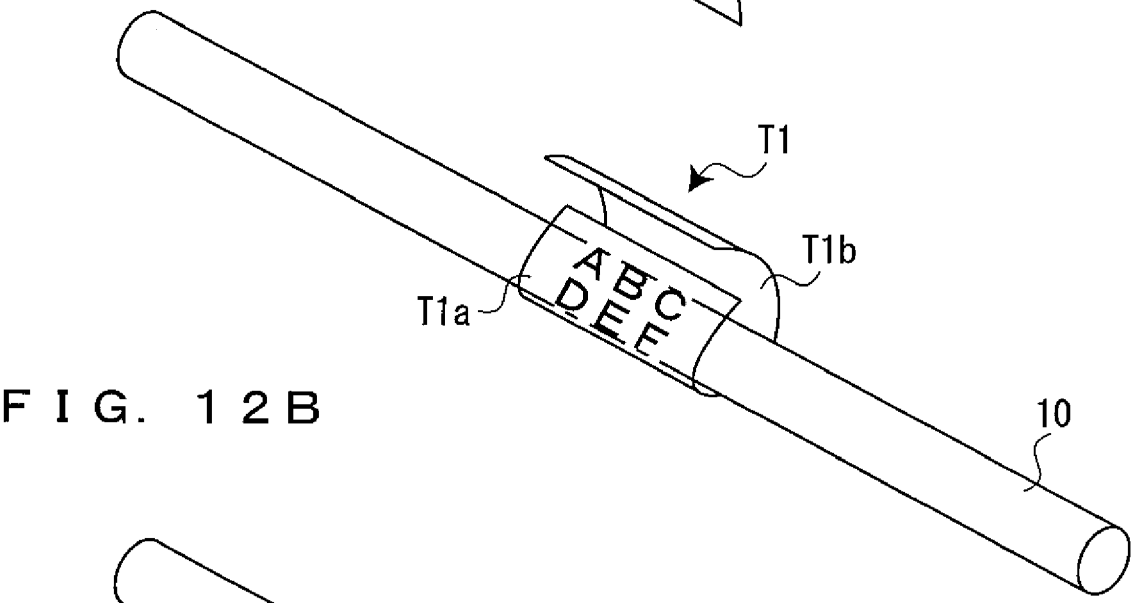
Figure 12C:
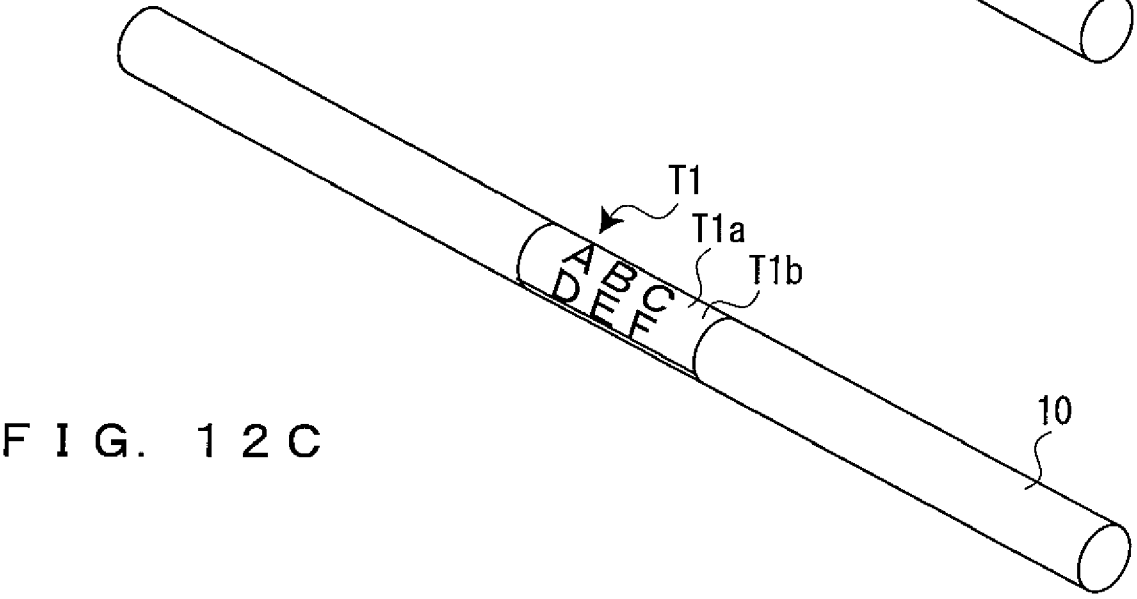

The special printing tape T used to create cable labels will be described hereinafter. As shown in FIG. 12A, the special printing tape T is formed of a printing region T1*a* with a white background on which a record tape T1 is formed at one end in the width direction and a winding region T1*b* with a transparent background that extends from the printing region T1*a* in the width direction. As shown in FIGS. 12B and 12C, cable labels made of the special printing tape T are affixed in such a manner that the printing region T1*a* on which the record tape T1 is formed is affixed in a desired position in the circumferential direction of the cable 10 and that the winding region T1*b* is wound to overlap the printing region T1*a* on the cable 10. Accordingly, the printing region T1*a* can be protected by the winding region T1*b*.

Figure 13:
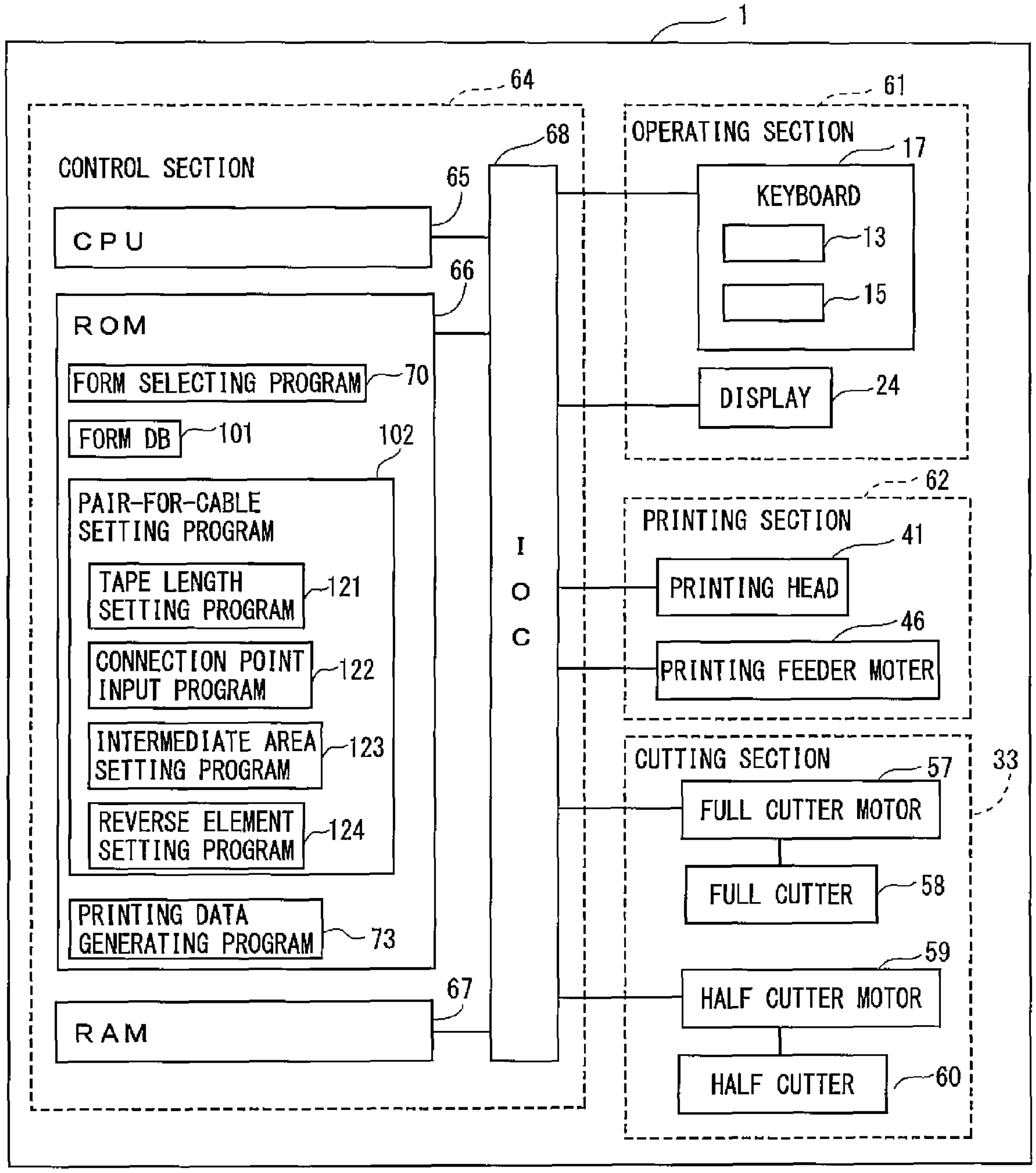
FIG. 13 is a control block diagram of a tape printing apparatus according to a second embodiment of the invention.

FIG. 13 is a control block diagram of the tape printing apparatus according to the second embodiment of the invention. As shown in FIG. 13, a form selection program 70, form database (hereinafter called "form DB") 101, pair-for-cable setting program 102 and printing data generating program 73 are memorized in a ROM 66 of a control section 64 in the tape printing apparatus 1.

The form DB 101 memorizes layouts for each printing form that are selectable using the form selecting program 70. When it generates printing data, the CPU 65 reads layouts for a selected printing form out of the form DB 101, generating printing data based on the layouts. To create a pair of cable labels, both first layouts and second layouts that are cable label layouts are memorized for a printing form, "Pair for Cable".

Figure 14A:
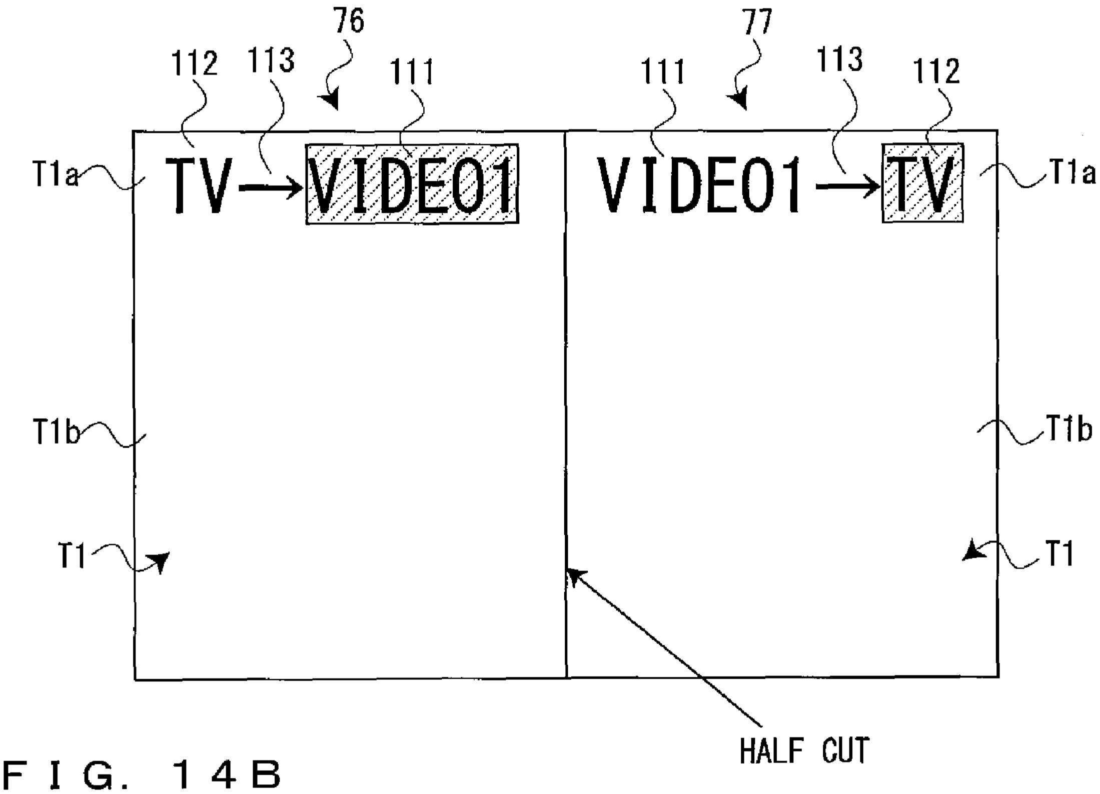
FIGS. 14A and 14B are views showing examples of created sets of cable labels.
Figure 14B:
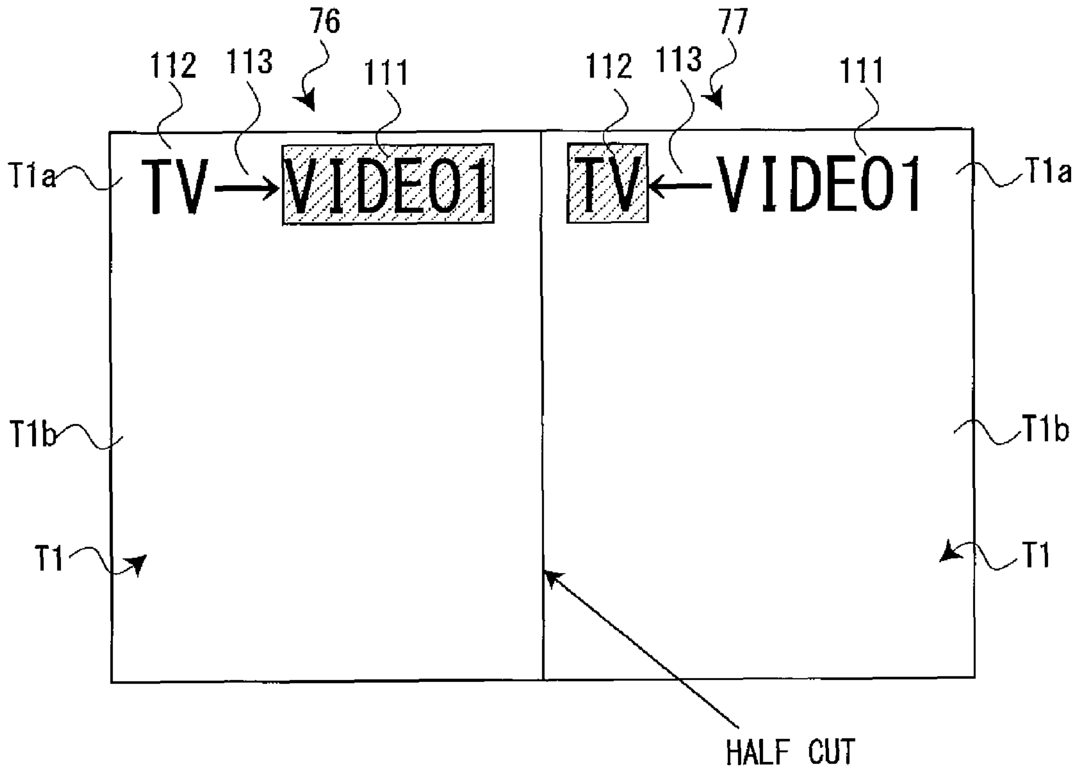
Figure 15:
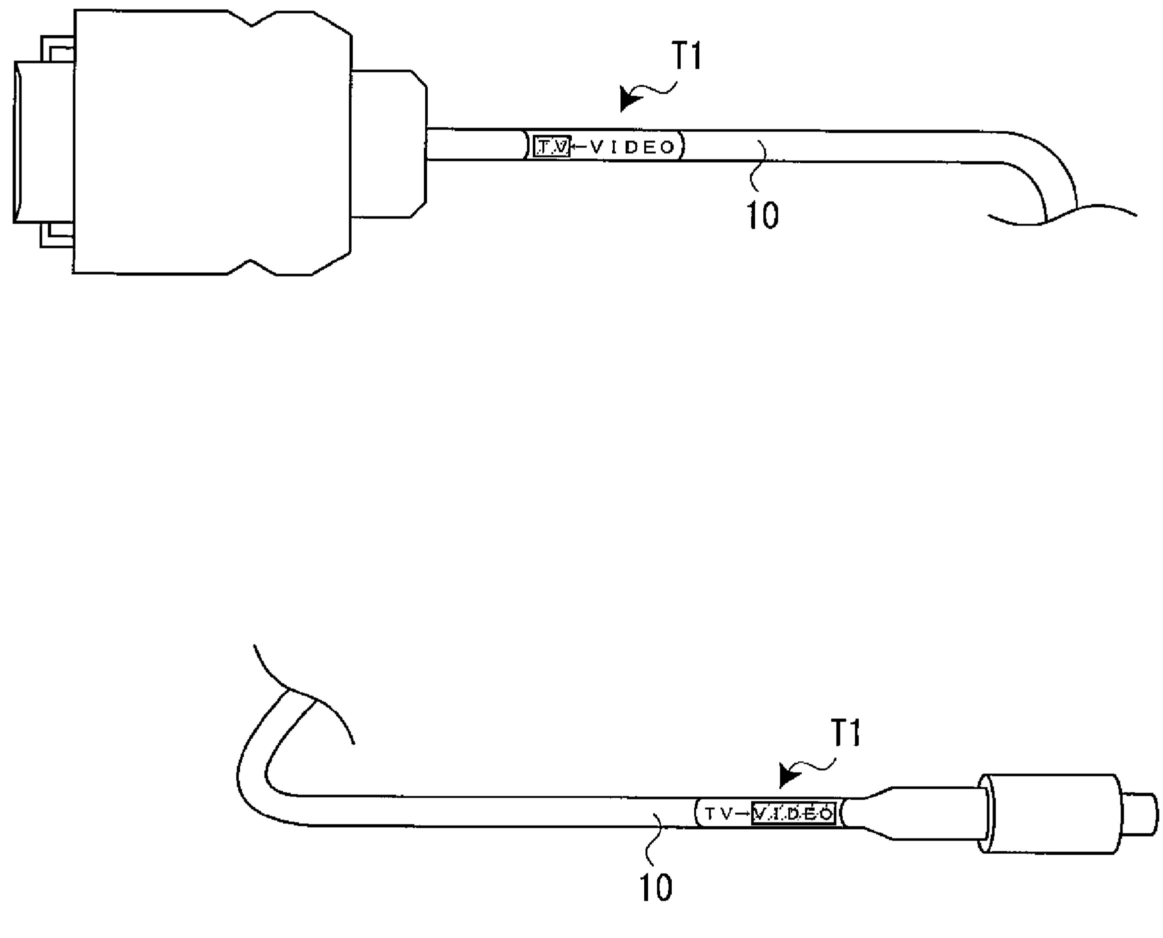
FIG. 15 is a view showing an example of a used set of cable labels.
Figure 16A:
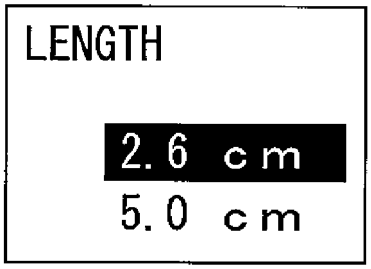
FIGS. 16A to 16E are diagrams showing various selection views and input views displayed in the tape printing apparatus according to the second embodiment.
Figure 16B:
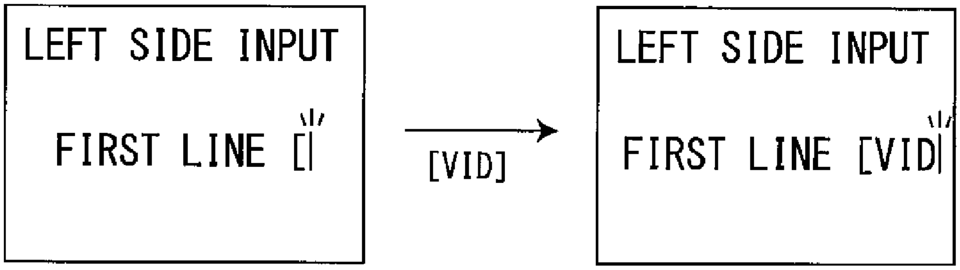
Figure 16C:
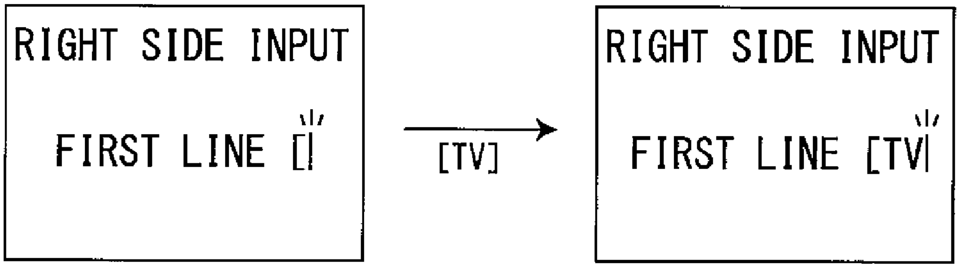
Figure 16D:
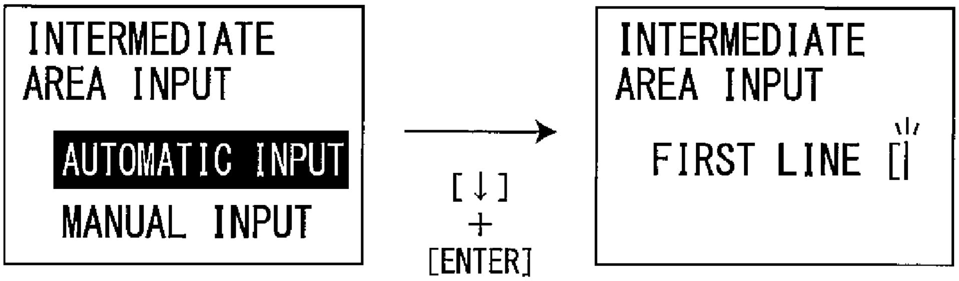
Figure 16E:
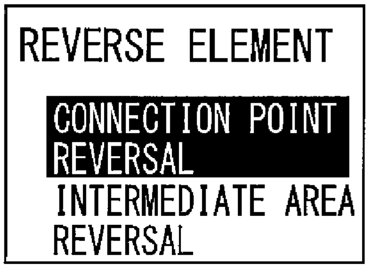

A pair of cable labels to be created with the first layout and the second layout will be described hereinafter, referring to FIGS. 14A, 14B and 15. FIGS. 14A and 14B are examples of a pair of cable labels. FIG. 15 is an example of usage of the pair of cable labels. As shown in FIGS. 14A and 14B, first printing data 76 generated with the first layout is printed in the printing region T1*a* on one cable label of a pair of cable labels Second printing data 77 generated with the second layout is printed in the printing region T1*a* on the other cable label. The first printing data 76 and the second printing data 77 include a first connection point name (first connection point information) 111 that is the name of a connection point to which one end of the cable 10 to affix the cable labels on is connected, a second connection point name (second connection point information) 112 that is the name of a connection point to which the other end of the cable 10 is connected and is printed in parallel with the first connection point name 111 in the tape length direction, and an intermediate area image 113 (arrows in the figure, emphasis mark images) that are arranged between the first connection point name 111 and the second connection point name 112. In other words, a pair of cable labels is printed in such a manner that the first connection point name 111, intermediate area image 113 and the second connection point name 112 or the second connection point name 112, intermediate area image 113 and first connection point name 111 are lined up in sequence in the tape length direction.

In the first printing data 76, the first connection point name 111 is given an emphasis style (bordering and shading). In the second printing data 77, the second connection point name 112 is given an emphasis style (bordering and shading). Thus, the first connection point name 111 is highlighted in the first printing data 76, while the second connection point name 112 is highlighted in the second printing data 77, which makes it possible to indicate which of the connection points to be connected to both ends of the cable 10 each cable label corresponds to. The intermediate area image 113 is also an emphasis element to highlight the first connection point name 111 or second connection point name 112. The respective created cable labels are affixed by the user on areas on the cable 10 that are close to their corresponding connection points as shown in FIG. 16.

The pair-for-cable setting program 102 is a program for determining all settings for a pair of cable labels when "Pair for Cable" is selected in the form selection view. The pair-for-cable setting program 102 includes a tape length setting program 121, a connection point input program 122, an intermediate area setting program 123 and a reverse element setting program 124.

The tape length setting program 121 is a program for setting the tape length of a cable label to be created. The CPU 65 that executes the tape length setting program 121 displays a tape length selection view (see FIG. 16A) on a display 24 to prompt the user to select the tape length. The user selects the tape length while giving visual enter in the selection view. The tape length selected at this moment is set to the tape length of each cable label. According to the embodiment, the user is prompted to select and input the tape length; however, the user may be prompted to input a numerical value of the tape length with an input view displayed. The tape length may be automatically set based on information of any cable label setting that is described below.

The connection point input program 122 is a program for inputting the names of the connection points that the cable 10 is connected to, namely, the first connection point name 111 and the second connection point name 112. The CPU 65 that executes the connection point input program 122 displays on the display 24 an input view (see FIGS. 16B and 16C) to allow inputting the first connection point name 111 and the second connection point name 112 to prompt the user to input the first connection point name 111 and the second connection point name 112. The user inputs the first connection point name 111 and the second connection point name 112 while giving visual enter in the input view (input unit). The first connection point name 111 and the second connection point name 112 that are thus input at this moment are printed on a set of cable labels, as mentioned above.

The intermediate area setting program 123 is a program for setting an intermediate area character string (including symbols) to be the intermediate area image 113. The CPU 65 that executes the intermediate area setting program 123 first displays on the display 24 a selection view (see FIG. 16D) to allow selecting "Automatic Input" to set the intermediate area character string automatically or "Manual Input" to set the intermediate area character string based on the user's operation. When the user selects "Automatic Input", the intermediate area character string is set to "→". When the user selects "Manual Input", the CPU 65 displays on the display 24 an intermediate area character string input view (see FIG. 16D) to prompt the user to input the intermediate area character string.

The reverse element setting program 124 is a program for determining whether the positions of the first connection point name 111 and the second connection point name 112 in the second printing data 77 are set reverse to those in the first printing data 76 and whether the horizontal orientation of the intermediate image 113 in the second printing data 77 is set reverse to that in the first printing data 76. The CPU 65 that executes the reverse element setting program 124 displays on the display 24 a selection view (see FIG. 16E) to allow selecting "Connection Point Reversal" to reverse the positions of the first connection point name 111 and the second connection point name 112, or "Intermediate Area Reversal" to reverse the horizontal orientation of the intermediate area image 113, in order to prompt the user to select elements to be reversed. In an example in which both connection points to which the cable 10 is connected are "VIDEO1" and "TV" and in which the intermediate area image 113 is "→", the first printing data 76 is printed as "TV→VIDEO1", and the second printing data 77 is printed as "VIDEO1→TV" (see FIG. 14A) when "Connection Point Reversal" is selected. The first printing data 76 is printed as "TV→VIDEO1" and the second printing data 77 is printed as "TV←VIDEO1" (see FIG. 14B) when "Intermediate Area Reversal" is selected. Whichever is selected, arrows thus point to the first connection point 111 and the second connection point 112 that respectively correspond thereto. A first emphasis mark image and a second emphasis mark image are formed of the intermediate area images 113 in this embodiment.

The CPU 65 that executes the printing data generating program 73 generates printing data based on the layout that corresponds to the selected printing form (and has read out of the form DB 101) and various types of setting information (printing data generating unit). To create a pair of cable labels, the CPU 65 generates the first printing data 76 according to the first layout and setting information provided by the pair-for-cable setting program 102; and generates the second printing data 77 according to the second layout and setting information provided by the pair-for-cable setting program 102.

Figure 17:
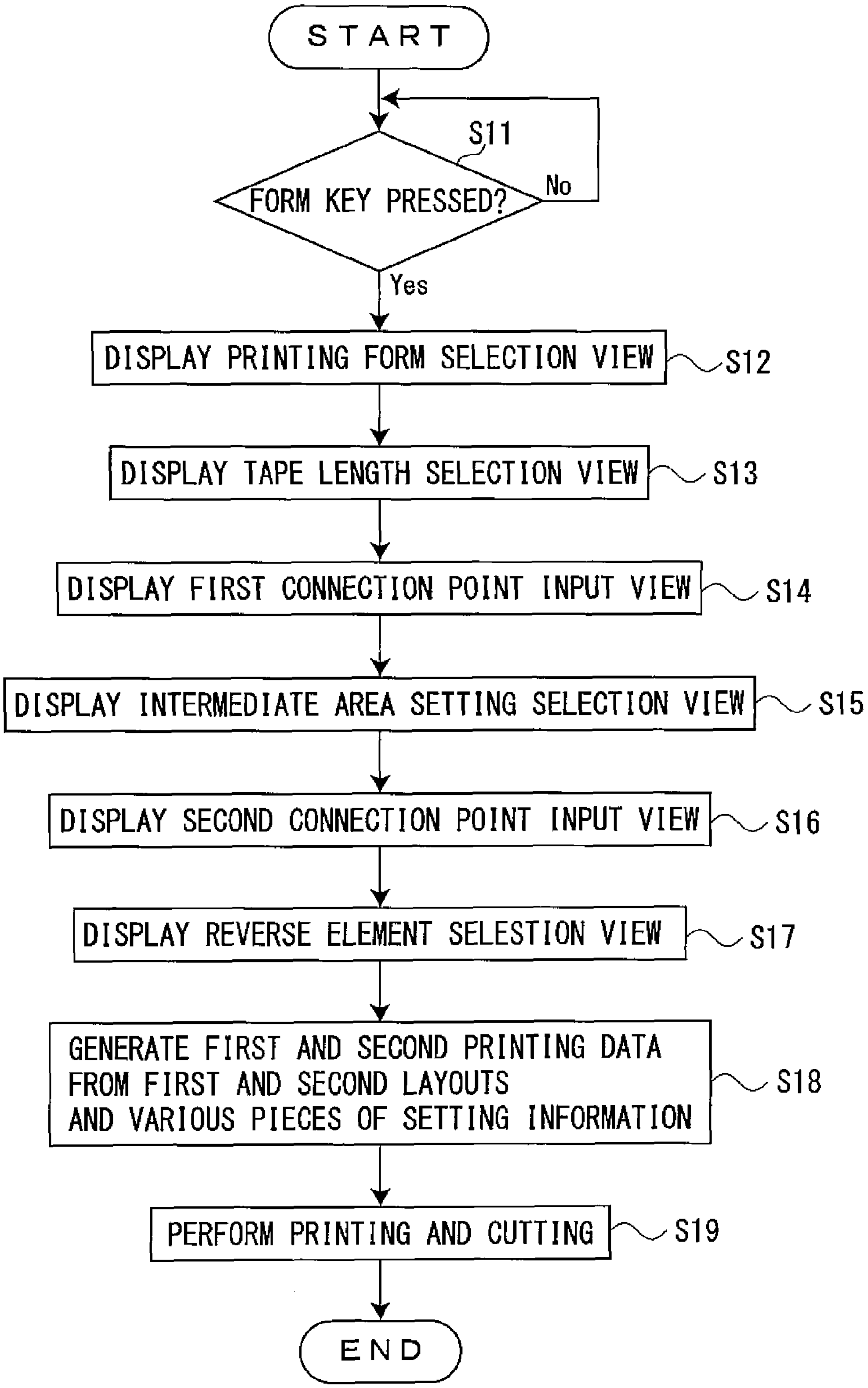
FIG. 17 is a flow chart showing creation operations for creating a set of cable labels in the tape printing apparatus.

Creation operations for creating a pair of cable labels in the tape printing apparatus 1 according to the second embodiment will be described hereinafter, referring to FIGS. 17 and 18. When the user presses a form key 15*a*, firstly, as shown in FIG. 17 (S11: Yes), the CPU 65 uses the form selecting program 70 to display a printing form selection view (S12) (FIG. 18: D51). In the embodiment, it is assumed that the user has selected "Special Form" in the selection view and subsequently selected "Pair for Cable" (FIG. 18: D53).

Figure 18:
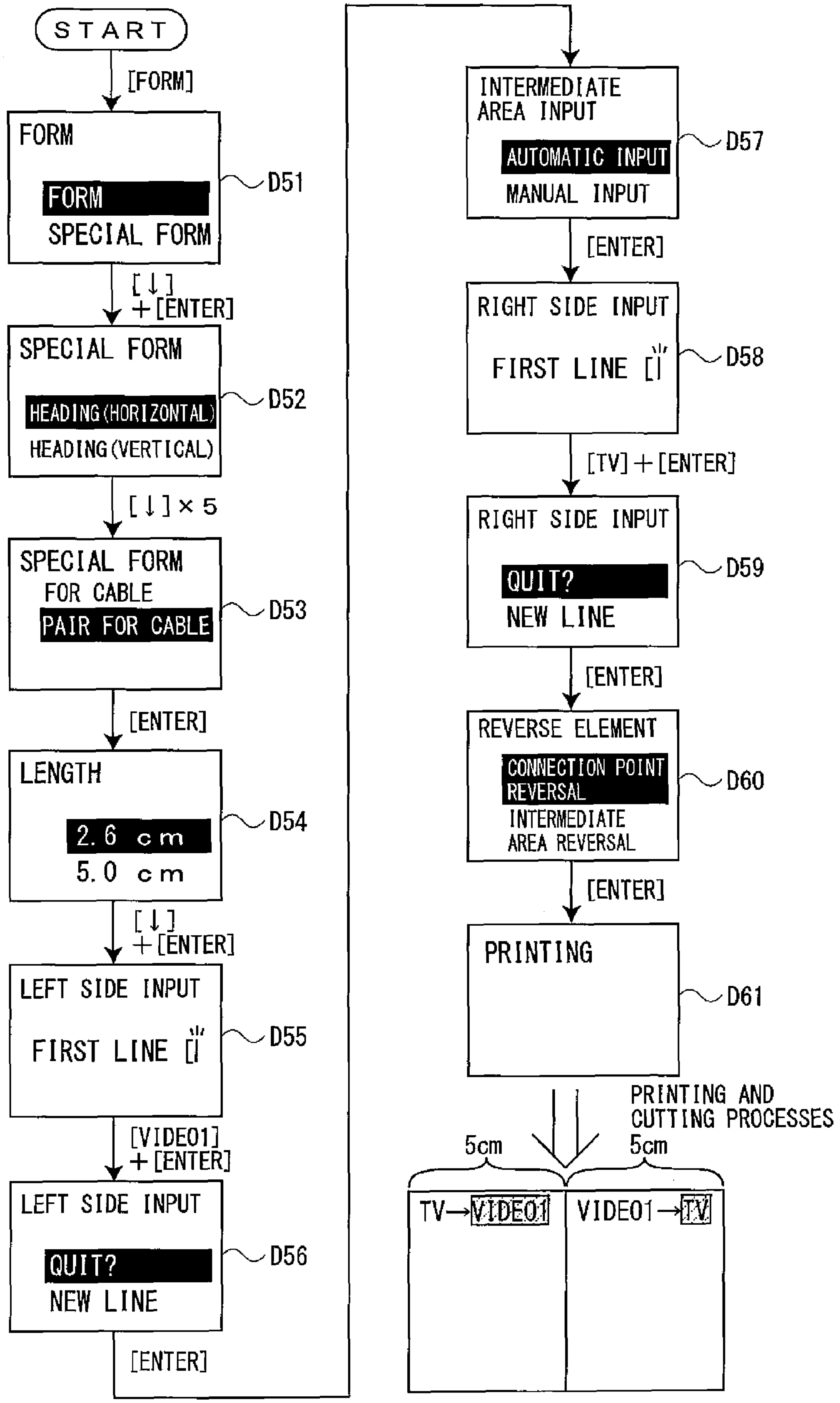
FIG. 18 is a diagram showing successive views displayed in the creation operations for creating a set of cable labels in the tape printing apparatus.

When "Pair for Cable" is selected, the CPU 65 uses the tape length setting program 121 to display a tape length selection view (S13) (FIG. 18: D54). In the embodiment, it is assumed that the user has selected "5.0 cm" in the selection view. When the tape length is selected, the CPU 65 uses the connection point input program 122 to display a first connection point name 111 input view (S14) (FIG. 18: D55). In the embodiment, the user inputs in the input view the name 111 of the first connection point to which the cable 10 is connected (inputs "VIDEO1"). More precisely, the user inputs "VIDEO1" at a blinking icon with character input keys 13, and presses the enter key 15*c*. When the enter key 15*c* is pressed, a selection view to allow choosing to terminate the input of the first connection point name 111 ("Quit?") or to start a new line to input the second line ("New Line") is displayed (FIG. 18: D56). At this moment, "Quit?" is selected to terminate the input of the first connection point name 111. When a connection point name that covers two or more lines is input, "New Line" is selected to start a new line and continue inputting. When the intermediate area character string or second connection point name 112 is input, the input is performed in the same input method, which is omitted from the following description.

When the input of the first connection point name 111 is terminated, the CPU 65 uses the intermediate area setting program 123 to display a selection view to allow choosing to have the intermediate area character string set automatically ("Automatic Input") or to set it manually ("Manual Input") (S15) (FIG. 18: D57). In the embodiment, the user selects a desired setting method (selects "Automatic Input" in the embodiment) and sets the intermediate area character string.

When the intermediate area character string is set, the CPU 65 uses the connection point input program 122 to display a second connection point name 112 input view (S16) (FIG. 18: D58). In the embodiment, the user inputs in the input view the name 112 of the second connection point to which the cable 10 is connected (inputs "TV").

When the input of the second connection point name 112 is terminated, the CPU 65 uses the reverse element setting program 124 to display a reverse element selection view (S17) (FIG. 18: D60). The user selects a desired setting in the selection view. When the settings are determined, the CPU 65 uses the printing data generating program 73 to generate the first printing data 76 and the second printing data 77 according to the first layout, second layout and various types of setting information (S18). Lastly, the CPU 65 uses the printing section 62 to print the first printing data 76 and the second printing data 77. Further, it uses the cutting section 33 to make a half cut in the area in which the first printing data 76 and the second printing data 77 adjoin on the printing tape T, and to make a full cut in the printing tape T in such a manner that it is cut in the set tape length. Thereby created is a pair of cable labels that has the first printing data 76 and the second printing data 77 printed thereon as shown in FIG. 14A.

Under the above configuration, the first connection point name 111 and the second connection point name 112 are input; subsequently, printing data in a printing format highlighting the first connection point information (the first printing data 76) and printing data in a printing format highlighting the second connection point information (the second printing data 77) are printed on the printing tape T, whereby the pair of cable labels created. With the pair of cable labels affixed on the areas on the cable 10 that are close to their corresponding connection points, the user can recognize both the connection points by referring to only one cable label. Simultaneous creation of both the cable labels facilitates the creation of a pair of cable labels. Since one connection point name is printed to be highlighted in comparison to the other connection point name, it is easy to identify a connection point corresponding to the end on which each cable label is affixed. Connection point information to be input may be marks or the like that indicate connection points instead of names, such as the first connection point name 111 and the second connection point name 112 as in the present embodiment.

Further, it is possible to achieve highlighting with a simple process: applying style processing (bordering and shading) that highlights the information of the respective connection points as an emphasis element for highlighting the information of the respective connection points; or adding emphasis mark images (intermediate area image 113) for highlighting the information of the respective connection points. The embodiment includes the two emphasis elements; however, it may include only any one of them. Bordering and shading is used as a style for highlighting the information of the respective connection points; however, other styles may be used. For example, a style for enlarging the connection point information of the corresponding connection point or a style for printing the connection point information in bold type may be used to highlight the information of the respective connection points. A style processing, such as size reduction and fine type, may be applied to make the connection point information of one connection point less noticeable in order to apply relative highlight processing to the connection point information of the other. According to the embodiment, the configuration allows applying automatic style processing; however, the configuration may include a style key for displaying a style menu and allow the user to apply style processing to the respective character strings for himself by pressing the style key when inputting the respective connection points. Before a character string is input with the character input keys 13 in the input of each connection point, for example, the style key is pressed to select a style item, such as "bordering" and "shading", from the displayed style menu and style the character string to be input.

Furthermore, the connection point information of one connection point is highlighted in comparison to the connection point information of the other in another manner that an arrow "→" that starts from the connection point information not to be highlighted and points to the connection point information to be highlighted is set as the intermediate area image 113 (emphasis mark image) when it is automatically set. Shapes of arrows to be the intermediate area image 113 are not limited as long as they can point to the targets and provide their orientations; for example, they may be triangles or images of a hand with a forefinger sticking out. They are not even limited tpushch emphasis mark images; for example, they may include arrows pointing downward to the first connection point name 111 and the second connection point name 112. According to the embodiment, the configuration allows the intermediate area image 113 setting to be changed through the user's operation using the intermediate area setting program 123; however, the configuration may allow setting the intermediate image 113 to a right arrow "→" all the time.

Additionally, the tape length setting unit for inputting one tape length included, the user can create a pair of nice-looking cable labels having the same length by cutting the printing tape T so that respective cable labels may have one tape length that has been selected and input. It is also easy to create a pair of cable labels having a desired tape length by inputting only one tape length.

Figure 19A:
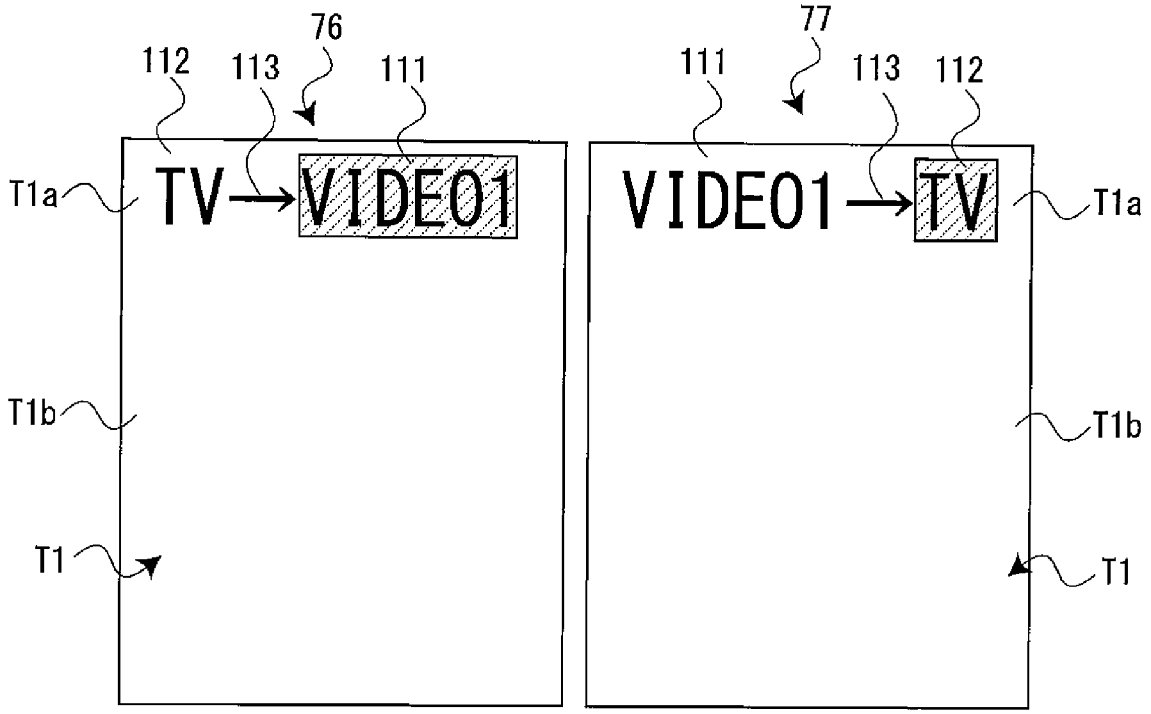
FIGS. 19A and 19B are views showing other examples of created sets of cable labels.
Figure 19B:
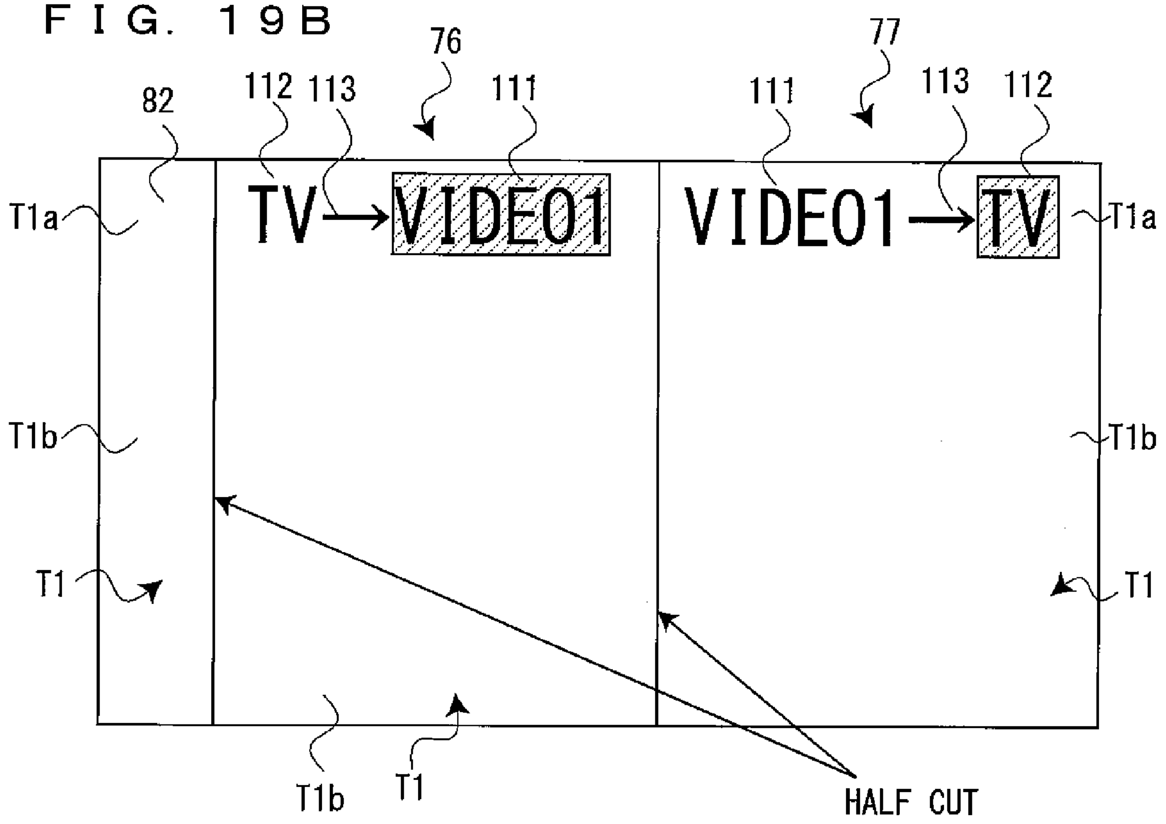

Moreover, the first printing data 76 and the second printing data 77 are printed to adjoin on the printing tape T, and a half cut is made in the area in which the first printing data 76 and the second printing data 77 adjoin so that a pair of cable labels will be output to be connected. Therefore, it is easy for the user to organize the pair of cable labels. The record tapes T1 of the cable labels serve as allowances for release of one another, which facilitates the release of each cable label record tape T1. As shown in FIG. 19A, a pair of cable labels may be created so that they will be cut off one another by making a full cut in the adjoining area. As shown in FIG. 19B, an allowance 82 for release may be formed at one end in the tape length direction of a pair of cable labels with a half cut made in the adjoining area.

According to the embodiment, an elongate printing tape T is used and cut in a predetermined length to create cable labels. However, a printing tape T may beforehand be cut into strips having a predetermined tape length, which may be used to create cable labels.

What is claimed is:

1. A label creating apparatus comprising:
- a memory unit to associate and memorize a first character or graphic with a second character or graphic that has an opposite meaning from the first character or graphic;
- an input unit to allow inputting the first character or graphic;
- a display unit to display according to the first character or graphic input with the input unit the second character or graphic memory in the memory unit; and
- a printing unit to print the first character or graphic that has been input and the second character or graphic that has been displayed,
- the label creating apparatus creating a pair of labels on which the characters or graphics that have the opposite meaning are respectively printed.

2. The label creating apparatus according to claim 1, further comprising a selection unit to allow selecting a desired character or graphic from a plurality of such second characters or graphics displayed on the display unit, wherein the printing unit prints the first character or graphic that has been input and the second character or graphic selected with the selection unit.

3. The label creating apparatus according to claim 2, further comprising a rewrite unit to allow rewriting the second character or graphic selected with the selection unit, wherein the printing unit prints the first character or graphic that has been input and the second character or graphic rewritten with the rewrite unit.

4. The label creating apparatus according to claim 3, wherein the second character or graphic rewritten with the rewrite unit is associated with the first character or graphic that has been input and memorized in the memory unit.

5. The label creating apparatus according to claim 1, wherein a label length having a shorter label length is set to a label length having a longer label length.

6. A label creating apparatus comprising:
- a memory unit to associate and memorize a first character or graphic with a second character or graphic that has a pairwise relationship with the first character or graphic;
- an input unit to allow inputting the first character or graphic;
- a display unit to display according to the first character or graphic input with the input unit the second character or graphic memory in the memory unit; and
- a printing unit to print the first character or graphic that has been input and the second character or graphic that has been displayed, wherein
- the label creating apparatus creates a pair of labels on which the characters or graphics that have the pairwise relationship are respectively printed; and
- the pair of labels are affixed at both ends of a cable; the input unit inputs for the first character or graphic first connection point information indicating a first connection point that is one of both connection points to which the cable is connected, and the second connection point information indicating a second connection point that is the other of the connection points to which the cable is connected; and the printing unit prints for the first character or graphic the first connection point information in a highlighted manner as compared with the second connection point information, and for the second character or graphic the second connection point information in a highlighted manner as compared with the first connection point information.

7. The label creating apparatus according to claim 6, wherein the printing unit applies to at least one of the first connection point information and the second connection point information style processing to highlight the first connection point information in comparison to the second connection point information for the first character or graphic and style processing to highlight the second connection point information in comparison to the first connection point information for the second character or graphic.

8. The label creating apparatus according to claim 6, wherein the printing unit prints a first emphasis mark image to highlight the first connection point information in comparison to the second connection point information for part of the first character or graphic, and a second emphasis mark image to highlight the second connection point information in comparison to the first connection point information for part of the second character or graphic.

9. The label creating apparatus according to claim 8, wherein the first emphasis mark image is an arrow that starts from the second connection point information and points to the first connection point information; and the second emphasis mark image is an arrow that starts from the first connection point information and points to the second connection point information.

10. A method for controlling a label creating apparatus including a memory section, an input section, a display section, a printing section, and a control section to control the foregoing sections, the method comprising, by the control section:
- associating and memorizing a first character or graphic with a second character or graphic having an opposite meaning from the first character or graphic in the memory section;
- displaying on the display section the second character or graphic memory in the memory section according to the first character or graphic input with the input section; and
- printing the first character or graphic input with the input section and the second character or graphic displayed on the display section with the printing section,
- a pair of labels being created on which the characters or graphics having the opposite meaning are respectively printed.

11. A non-transitory computer program embodied in a computer-readable medium that causes a computer to perform each process included in the method for controlling the label creating apparatus as set forth in claim 10.

* * * * *